US010380770B2

(12) United States Patent
Stewart

(10) Patent No.: US 10,380,770 B2
(45) Date of Patent: Aug. 13, 2019

(54) INTERACTIVE DATA VISUALIZATION USER INTERFACE WITH MULTIPLE INTERACTION PROFILES

(71) Applicant: Tableau Software, Inc., Seattle, WA (US)

(72) Inventor: Robin Stewart, Seattle, WA (US)

(73) Assignee: Tableau Software, Inc., Seattle, WA (US)

( * ) Notice: Subject to any disclaimer, the term of this patent is extended or adjusted under 35 U.S.C. 154(b) by 212 days.

(21) Appl. No.: 15/260,261

(22) Filed: Sep. 8, 2016

(65) Prior Publication Data

US 2017/0069118 A1 Mar. 9, 2017

Related U.S. Application Data

(60) Provisional application No. 62/215,653, filed on Sep. 8, 2015, provisional application No. 62/221,084, filed on Sep. 20, 2015.

(51) Int. Cl.
*G06T 11/20* (2006.01)
*G06F 3/0482* (2013.01)
(Continued)

(52) U.S. Cl.
CPC .......... *G06T 11/206* (2013.01); *G06F 3/0482* (2013.01); *G06F 3/04845* (2013.01);
(Continued)

(58) Field of Classification Search
CPC ............... G06T 11/206; G06T 2200/24; G06F 17/30554; G06F 3/0484; G06F 17/30061;
(Continued)

(56) References Cited

U.S. PATENT DOCUMENTS 5,414,809 A 5/1995 Hogan et al.
5,717,939 A 2/1998 Bricklin et al.
(Continued)

FOREIGN PATENT DOCUMENTS

EP 2386940 A1 11/2011

OTHER PUBLICATIONS

Apple, macOS Human Interface Guidelines—Drag and Drop, <URL: https://developer.apple.com/library/content/documentation/UserExperience/Conceptual/OSXHIGuidelines/DragDrop.html>, updated Dec. 12, 2016, 5 pgs.
(Continued)

*Primary Examiner* — Andrew L Tank
(74) *Attorney, Agent, or Firm* — Morgan, Lewis & Bockius LLP

(57) ABSTRACT

A user selects a dataset and a first interaction profile. The first interaction profile is one of: category world, time world, or geography world. The first interaction profile corresponds to a first data visualization user interface. Without further user interaction, a method selects multiple fields in the dataset according to the first interaction profile and displays a first data visualization according to the first interaction profile. The first data visualization includes visual marks based on the selected fields. The user specifies some data visualization characteristics, and the method updates the first data visualization according to these characteristics. The user selects a second interaction profile. In response, the method displays a second data visualization user interface corresponding to the second interaction profile, and displays a second data visualization using at least a subset of the multiple fields, where the second data visualization is displayed according to the user-specified characteristics.

20 Claims, 32 Drawing Sheets

(51) Int. Cl.
*G06F 3/0484* (2013.01)
*G06F 3/0488* (2013.01)
*G06F 16/26* (2019.01)

(52) U.S. Cl.
CPC ...... *G06F 3/04847* (2013.01); *G06F 3/04883* (2013.01); *G06F 16/26* (2019.01); *G06T 2200/24* (2013.01)

(58) Field of Classification Search
CPC ........... G06F 17/3098; G06F 17/30557; G06F 3/04847; G06F 3/0482; G06F 3/04883; G06F 16/26; G06F 3/04845
See application file for complete search history.

(56) References Cited

U.S. PATENT DOCUMENTS 5,806,078 A 9/1998 Hug et al.
5,874,965 A 2/1999 Takai et al.
6,400,366 B1 * 6/2002 Davies .................. G06T 11/206 345/440
6,529,217 B1 3/2003 Maguire, III et al.
7,345,688 B2 3/2008 Baudisch et al.
7,420,562 B2 9/2008 Shinohara et al.
7,469,381 B2 12/2008 Ording
8,106,856 B2 1/2012 Matas et al.
8,527,909 B1 * 9/2013 Mullany ............... G06F 3/0484 345/173
8,654,125 B2 2/2014 Gibson
8,762,867 B1 6/2014 Mattos et al.
8,832,588 B1 9/2014 Kerzner et al.
8,836,726 B1 9/2014 Schickler
8,996,978 B2 3/2015 Richstein et al.
9,389,777 B2 7/2016 Sekharan
2002/0024535 A1 2/2002 Ueno et al.
2002/0118192 A1 8/2002 Couckuyt et al.
2002/0129053 A1 9/2002 Chan et al.
2003/0030634 A1 2/2003 Sang'udi et al.
2005/0060647 A1 * 3/2005 Doan ................ G06F 17/30554 715/205
2006/0080594 A1 4/2006 Chavoustie et al.
2007/0190924 A1 8/2007 Stadheim et al.
2007/0233666 A1 10/2007 Carlson et al.
2007/0285426 A1 12/2007 Matina
2008/0010670 A1 1/2008 Campbell et al.
2008/0046805 A1 2/2008 Shewchenko et al.
2008/0192056 A1 * 8/2008 Robertson ............. G06T 11/206 345/440
2008/0195930 A1 8/2008 Tolle
2008/0229242 A1 9/2008 Goering
2008/0288201 A1 11/2008 Oettinger et al.
2009/0013287 A1 * 1/2009 Helfman ............... G06T 11/206 715/853
2009/0135240 A1 5/2009 Phaneuf et al.
2009/0171606 A1 7/2009 Murata et al.
2009/0178007 A1 7/2009 Matas et al.
2009/0254557 A1 * 10/2009 Jordan .............. G06F 17/30905
2009/0267947 A1 10/2009 Libby et al.
2009/0313537 A1 12/2009 Fu et al.
2010/0079499 A1 4/2010 Scott et al.
2010/0083089 A1 4/2010 Rapp et al.
2010/0174678 A1 7/2010 Massand
2010/0205520 A1 8/2010 Parish et al.
2010/0211920 A1 8/2010 Westerman et al.
2010/0238176 A1 9/2010 Guo et al.
2010/0283800 A1 11/2010 Cragun et al.
2011/0074710 A1 3/2011 Weeldreyer et al.
2011/0106791 A1 5/2011 Maim
2011/0115814 A1 5/2011 Heimendinger et al.
2011/0145689 A1 6/2011 Campbell et al.
2011/0154188 A1 6/2011 Forstall et al.
2011/0164055 A1 7/2011 McCullough et al.
2011/0283231 A1 11/2011 Richstein et al.
2012/0005045 A1 1/2012 Baker
2012/0013540 A1 1/2012 Hogan
2012/0023449 A1 1/2012 Zabielski
2012/0158623 A1 * 6/2012 Bilenko ............... G06N 99/005 706/12
2012/0159380 A1 6/2012 Kocienda et al.
2012/0166470 A1 6/2012 Baumgaertel et al.
2012/0180002 A1 7/2012 Campbell et al.
2012/0233573 A1 9/2012 Sullivan et al.
2012/0240064 A1 9/2012 Ramsay et al.
2012/0254783 A1 10/2012 Pourshahid et al.
2012/0284601 A1 11/2012 Chan et al.
2012/0313957 A1 * 12/2012 Fisher ..................... G06T 13/80 345/589
2012/0324357 A1 12/2012 Viegers et al.
2013/0009963 A1 1/2013 Albrecht
2013/0019205 A1 1/2013 Gil et al.
2013/0024803 A1 1/2013 Workman et al.
2013/0080884 A1 3/2013 Lisse et al.
2013/0111319 A1 5/2013 Lin et al.
2013/0111321 A1 5/2013 Dorrell
2013/0120267 A1 5/2013 Pasquero et al.
2013/0120358 A1 5/2013 Fan et al.
2013/0174087 A1 7/2013 Chen et al.
2013/0194272 A1 * 8/2013 Hao ...................... G06T 11/206 345/440
2013/0275904 A1 10/2013 Bhaskaran et al.
2013/0293480 A1 11/2013 Kritt et al.
2013/0298085 A1 11/2013 Kritt et al.
2013/0314341 A1 11/2013 Lee et al.
2013/0332810 A1 12/2013 Lin et al.
2014/0049557 A1 2/2014 Hou et al.
2014/0053091 A1 2/2014 Hou et al.
2014/0068403 A1 3/2014 Bhargav et al.
2014/0075286 A1 3/2014 Harada
2014/0098020 A1 4/2014 Koshi et al.
2014/0109012 A1 4/2014 Choudhary et al.
2014/0113268 A1 4/2014 Dhasmana et al.
2014/0129985 A1 5/2014 Morozov et al.
2014/0136939 A1 5/2014 Chan et al.
2014/0149947 A1 * 5/2014 Blyumen ................ G06F 17/30 715/863
2014/0157142 A1 6/2014 Heinrich et al.
2014/0181756 A1 6/2014 Kuo
2014/0198105 A1 * 7/2014 Gibson ................. G06T 11/206 345/440
2014/0218383 A1 8/2014 Srivastava
2014/0223350 A1 8/2014 Woodward
2014/0247268 A1 9/2014 Drucker et al.
2014/0267424 A1 9/2014 Benson et al.
2014/0281867 A1 9/2014 Vogel et al.
2014/0281868 A1 9/2014 Vogel et al.
2014/0282124 A1 9/2014 Grealish et al.
2014/0282276 A1 9/2014 Drucker et al.
2014/0320539 A1 10/2014 Hao et al.
2014/0336786 A1 11/2014 Asenjo et al.
2014/0372952 A1 12/2014 Otero et al.
2014/0380140 A1 12/2014 Kapahi
2014/0380178 A1 12/2014 Kapahi
2015/0007078 A1 * 1/2015 Feng ..................... G06F 3/0484 715/771
2015/0015504 A1 1/2015 Lee et al.
2015/0026554 A1 1/2015 Hogan
2015/0029213 A1 1/2015 Benson et al.
2015/0058801 A1 2/2015 John et al.
2015/0135113 A1 5/2015 Sekharan
2015/0169531 A1 6/2015 Campbell et al.
2015/0254369 A1 9/2015 Hou et al.
2015/0278315 A1 * 10/2015 Baumgartner .... G06F 17/30554 715/763
2016/0004423 A1 1/2016 Springer et al.
2016/0055232 A1 * 2/2016 Yang ..................... G06T 11/206 707/740
2016/0070015 A1 3/2016 Sastry et al.
2016/0104311 A1 4/2016 Allyn
2016/0154575 A1 6/2016 Xie et al.
2016/0224221 A1 8/2016 Liu et al.

(56) References Cited

U.S. PATENT DOCUMENTS

| | | | |
|---|---|---|---|
| 2017/0004638 A1 | 1/2017 | Csenteri et al. |
| 2017/0169592 A1 | 6/2017 | Ruble et al. |

OTHER PUBLICATIONS

Drucker et al., Touch Viz: A Case Study Comparing Two Interfaces for Data Analytics on Tablets, *CHI'3*, Apr. 27-May 2, 2013, Paris, France, downloaded from http://research.microsoft.com/jump/189003, 10 pgs.
Glueck et al., Dive In! Enabling Progressive Loading for Real-Time Navigation of Data Visualizations, CHI 2014, Apr. 26-May 1, 2014 Toronto, ON, Canada, 10 pgs.
Microsoft, Guidelines for drag animations, <URL: https://msdn.microsoft.com/en-us/windows/hardware/drivers/hh465193>, © 2017, 2 pgs.
Stewart, Office Action, U.S. Appl. No. 14/603,312, dated Feb. 7, 2017, 11 pgs.
Stewart, Final Office Action, U.S. Appl. No. 14/603,312, dated Aug. 28, 2017, 15 pgs.
Stewart, Office Action, U.S. Appl. No. 14/603,312, dated Apr. 4, 2018, 12 pgs.
Stewart, Final Office Action, U.S. Appl. No. 14/603,312, dated Nov. 8, 2018, 12 pgs.
Stewart, Office Action, U.S. Appl. No. 14/603,302, dated Feb. 27, 2017, 18 pgs.
Stewart, Final Office Action, U.S. Appl. No. 14/603,302, dated Sep. 25, 2017, 15 pgs.
Stewart, Office Action, U.S. Appl. No. 14/603,302, dated Apr. 6, 2018, 16 pgs.
Stewart, Final Office Action, U.S. Appl. No. 14/603,302, dated Nov. 8, 2018, 17 pgs.
Stewart, Office Action, U.S. Appl. No. 14/603,322, dated Mar. 9, 2017, 19 pgs.
Stewart, Office Action, U.S. Appl. No. 14/603,322, dated Oct. 20, 2017, 12 pgs.
Stewart, Office Action, U.S. Appl. No. 14/603,322, dated Jun. 1, 2018, 11 pgs.
Stewart, Office Action, U.S. Appl. No. 14/603,330, dated Apr. 13, 2017, 15 pgs.
Stewart, Notice of Allowance, U.S. Appl. No. 14/603,330, dated Oct. 3, 2017, 10 pgs.
Stewart, Office Action, U.S. Appl. No. 15/172,052, dated Jan. 10, 2018, 11 pgs.
Stewart, Office Action, U.S. Appl. No. 15/172,052, dated Dec. 4, 2018, 26 pgs.
Stewart, Office Action, U.S. Appl. No. 15/172,085, dated Sep. 7, 2017, 9 pgs.
Stewart, Final Office Action, U.S. Appl. No. 15/172,085, dated Mar. 8, 2018, 13 pgs.
Stewart, Notice of Allowance, U.S. Appl. No. 15/172,085, dated Mar. 26, 2019, 8 pgs.
Stewart, Office Action, U.S. Appl. No. 15/172,076, dated Oct. 5, 2017, 11 pgs.
Stewart, Final Office Action, U.S. Appl. No. 15/172,076, dated Jul. 3, 2018, 12 pgs.
Stewart, Notice of Allowance, U.S. Appl. No. 15/172,076, Jan. 3, 2019, 9 pgs.
Tableau, International Search Report and Written Opinion, PCT/US2016/052689, dated Dec. 5, 2016, 11 pgs.
Tableau, International Preliminary Report on Patentability, PCT/US2016/052689, dated Mar. 20, 2018, 8 pgs.
Tableau, Communication Pursuant to Rules 161(1) and 162, EP16775417.5, May 17, 2018, 3 pgs.

* cited by examiner

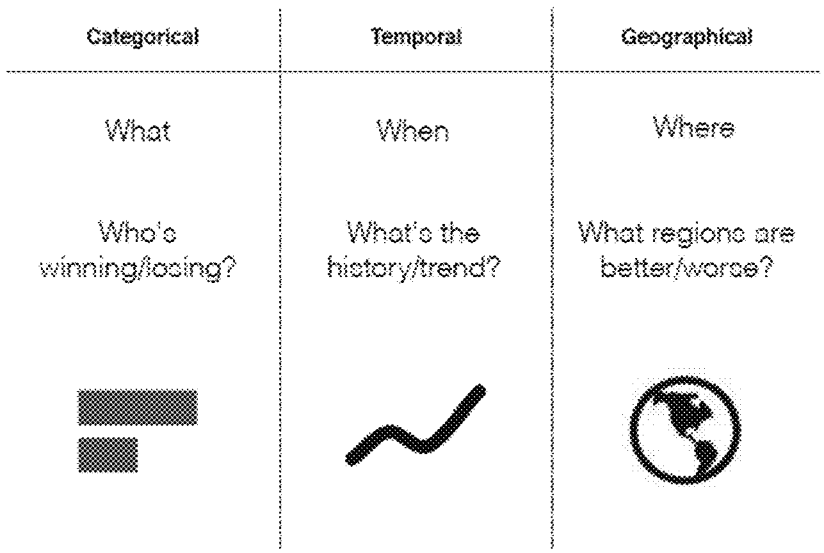
Figure 6
Figure 7
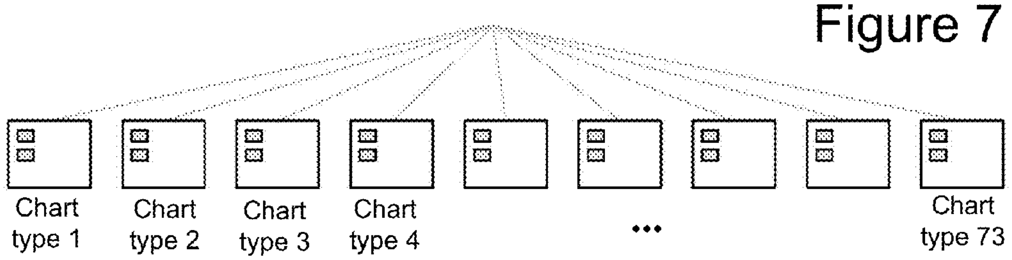
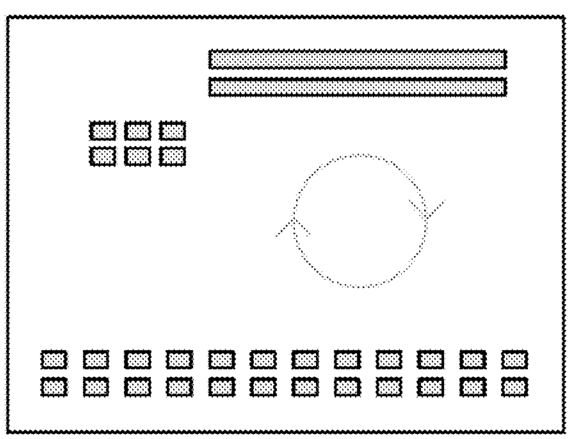
Figure 8

INTERACTIVE DATA VISUALIZATION USER INTERFACE WITH MULTIPLE INTERACTION PROFILES

CROSS REFERENCE TO RELATED APPLICATIONS

This application claims priority to U.S. Provisional Application Ser. No. 62/215,653, filed Sep. 8, 2015, entitled "Interactive Data Visualization User Interface with Multiple Interaction Profiles," which is incorporated by reference herein in its entirety.

This application also claims priority to U.S. Provisional Application No. 62/221,084, filed Sep. 20, 2015, entitled "Interactive Data Visualization User Interface," which is hereby incorporated by reference in its entirety.

This application is related to U.S. patent application Ser. No. 15/172,052, filed Jun. 2, 2016, entitled "Interactive Data Visualization User Interface with Gesture-based Data Field Selection," which is a continuation-in-part of U.S. patent application Ser. No. 14/603,302, filed Jan. 22, 2015, entitled "Methods and Devices for Adjusting Chart Filters," which claims priority to U.S. Provisional Application No. 62/047,429, filed Sep. 8, 2014, entitled "Methods and Devices for Manipulating Graphical Views of Data," each of which is hereby incorporated by reference in its entirety.

TECHNICAL FIELD

This invention relates generally to user interfaces for data visualization applications and more specifically to user interfaces in which interaction behavior changes dynamically based on which interaction profile a user has selected.

BACKGROUND

Data sets with hundreds of variables or more arise today in many contexts. Examples include: gene expression data for uncovering the link between the genome and the various proteins for which it codes; demographic and consumer profiling data for capturing underlying sociological and economic trends; sales and marketing data for huge numbers of products in vast and ever-changing marketplaces; and environmental measurements for understanding phenomena such as pollution, meteorological changes, and resource impact issues.

Data visualization is a powerful tool for exploring large data sets, both by itself and coupled with data mining algorithms. Graphical views provide user-friendly ways to visualize and interpret data. However, the task of effectively visualizing large databases imposes significant demands on the human-computer interface to the visualization system.

In addition, as computing and networking speeds increase, data visualization that was traditionally performed on desktop computers can also be performed on portable electronic devices, such as smart phones, tablets, and laptop computers. These portable devices typically use touch-sensitive surfaces (e.g., touch screens and/or trackpads) as input devices. These portable devices typically have smaller displays than desktop computers. Thus, additional challenges arise in using touch-sensitive surfaces to manipulate graphical views of data in a user-friendly manner on portable devices.

Consequently, there is a need for faster, more efficient methods and interfaces for manipulating graphical views of data. Such methods and interfaces may complement or replace conventional methods for visualizing data. Such methods and interfaces reduce the cognitive burden on a user and produce a more efficient human-machine interface. For battery-operated devices, such methods and interfaces conserve power and increase the time between battery charges.

SUMMARY

The above deficiencies and other problems associated with visualizing data are reduced or eliminated by the disclosed methods, devices, and storage media. Various implementations of methods, devices, and storage media within the scope of the appended claims each have several aspects, no single one of which is solely responsible for the attributes described herein.

As described below, some data visualization applications provide multiple distinct "worlds," and each of these worlds provides a different set of behaviors that are tuned to answer different sets of analytic questions about a dataset. In some instances, these worlds are referred to as "interaction profiles." Some implementations include interaction profiles for "category world," "time world," and "geography world" as described in more detail below. Some implementations provide an interaction profile for "relationship world," which is tuned for displaying relationships, such as a node-link graph.

In accordance with some implementations, a method is performed at a computing device having one or more processors and memory. The memory stores one or more programs configured for execution by the one or more processors. The method receives user selection of a dataset and user selection of a first interaction profile. In some implementations, the first interaction profile is one of: category world, time world, or geography world. The first interaction profile corresponds to a first data visualization user interface. Without further user interaction, the method selects a first plurality of fields in the dataset according to the first interaction profile and displays a first data visualization in the first data visualization user interface according to the first interaction profile. The first data visualization includes visual marks based on the first plurality of fields in the dataset. The method then receives user specification of one or more data visualization characteristics in the first data visualization user interface, and updates the first data visualization according to the specified one or more data visualization characteristics. The user selects a second interaction profile that is distinct from the first interaction profile. In response to the user selection of the second interaction profile, the method displays a second data visualization user interface corresponding to the second interaction profile and displays a second data visualization using at least a subset of the first plurality of fields in the dataset. The second data visualization is displayed in accordance with the specified one or more data visualization characteristics.

In some instances, the specified one or more data visualization characteristics include color encoding of the visual marks. In some instances, the specified one or more data visualization characteristics include size encoding of the visual marks. In some instances, the specified one or more data visualization characteristics include specifying which aggregation function is used for summarizing data values for fields that are aggregated. In some implementations, the specified aggregation function is one of: SUM, AVERAGE, MIN, MAX, MEDIAN, or QUANTILE.

In some implementations, the first interaction profile is category world, and the second interaction profile is time world.

In some implementations, the method includes, in response to the user selection of the second interaction profile, automatically selecting one or more additional fields from the dataset, where the one or more additional fields are not in the first plurality of fields. Displaying the second data visualization uses the one or more additional fields.

In some implementations, a method is performed at an electronic device with a touch-sensitive surface and a display. The method includes displaying a first chart on the display. The first chart concurrently displays a first set of categories, and each respective category in the first set of categories has a corresponding visual mark displayed in the first chart. The method also includes detecting a first touch input at a location on the touch-sensitive surface that corresponds to a location on the display of a first visual mark for a first category in the first chart. The method further includes, in response to detecting the first touch input at the location on the touch-sensitive surface that corresponds to the location on the display of the first visual mark for the first category in the first chart: removing the first category and the first visual mark from the first chart via an animated transition, where the first visual mark moves in concert with movement of a finger contact in the first touch input during at least a portion of the animated transition; and updating the display of the first chart.

In some implementations, the first touch input is a drag gesture or a swipe gesture that moves in a first predefined direction on the touch-sensitive surface.

In some implementations, the method includes, in response to detecting the first touch input at the location on the touch-sensitive surface that corresponds to the location on the display of the first visual mark for the first category in the first chart, ceasing to display the first visual mark.

In some implementations, the method includes, in response to detecting the first touch input at the location on the touch-sensitive surface that corresponds to the location on the display of the first visual mark for the first category in the first chart, displaying an indicium that the first category has been removed.

In some implementations, the method includes, while displaying the indicium that the first category has been removed, changing from displaying the first chart with the first set of categories, other than the first category, to displaying a second chart. The second chart concurrently displays a second set of categories that are distinct from the first set of categories, and each respective category in the second set of categories has a corresponding visual mark displayed in the second chart. The method also includes, while displaying the second chart with the second set of categories, detecting a second touch input at a location on the touch-sensitive surface that corresponds to a location on the display of the indicium that the first category has been removed and, in response to detecting the second touch input at the location on the touch-sensitive surface that corresponds to the location on the display of the indicium that the first category has been removed, updating the display of the second chart to reflect inclusion of data that corresponds to the first category in the first chart.

In some implementations, updating the display of the second chart to reflect inclusion of data that corresponds to the first category in the first chart includes reordering the display of the second set of categories in the second chart.

In some implementations, the method includes, after updating the display of the second chart to reflect inclusion of data that corresponds to the first category, detecting a third touch input, and, in response to detecting a third touch input, updating the display of the second chart to reflect the removal of data that corresponds to the first category in the first chart.

In some implementations, the method includes, while displaying the first chart on the display, detecting a fourth touch input at a location on the touch-sensitive surface that corresponds to a location on the display of a second visual mark for a second category in the first chart. The method also includes, in response to detecting the fourth touch input at the location on the touch-sensitive surface that corresponds to the location on the display of the second visual mark for the second category in the first chart: maintaining the display of the second category and the second visual mark in the second chart; removing the display of all categories, other than the second category, in the first set of categories; and removing the display of all visual marks, other than the second visual mark, that correspond to categories in the first set of categories.

In some implementations, the method includes, in response to detecting the fourth touch input at the location on the touch-sensitive surface that corresponds to the location on the display of the second visual mark for the second category in the first chart, displaying an indicium that only the second category in the first set of categories remains displayed.

In some implementations, the first touch input is a drag gesture or a swipe gesture that moves in a first predefined direction on the touch-sensitive surface and the fourth touch input is a drag gesture or a swipe gesture that moves in a second predefined direction on the touch-sensitive surface that is distinct from the first predefined direction.

In some implementations, the first touch input is one of: a tap gesture, a drag gesture, a swipe gesture, a pinch gesture, or an unpinch gesture. In some implementations, the fourth touch input is one of: a tap gesture, a drag gesture, a swipe gesture, a pinch gesture, or an unpinch gesture.

Some implementations include electronic devices for visualizing data. In some implementations, an electronic device for visualizing data includes a display, a touch-sensitive surface, one or more processors, memory, and one or more programs stored in the memory and configured to be executed by the one or more processors. The one or more programs include instructions for displaying a first chart on the display. The first chart concurrently displays a first set of categories, and each respective category in the first set of categories has a corresponding visual mark displayed in the first chart. The one or more programs also include instructions for detecting a first touch input at a location on the touch-sensitive surface that corresponds to a location on the display of a first visual mark for a first category in the first chart. The one or more programs further include instructions for, in response to detecting the first touch input at the location on the touch-sensitive surface that corresponds to the location on the display of the first visual mark for the first category in the first chart: removing the first category and the first visual mark from the first chart via an animated transition, where the first visual mark moves in concert with movement of a finger contact in the first touch input during at least a portion of the animated transition; and updating the display of the first chart.

In some implementations, an electronic device for visualizing data includes a display, a touch-sensitive surface, one or more processors, memory, and one or more programs stored in the memory and configured to be executed by the one or more processors. The one or more programs include instructions for performing any of the methods described herein.

Some implementations include a non-transitory computer readable storage medium, storing one or more programs configured for execution by one or more processors of an electronic device with a display and a touch-sensitive surface. The one or more programs include instructions for performing any of the methods described herein.

Some implementations include a graphical user interface on an electronic device with a display, a touch-sensitive surface, a memory, and one or more processors to execute one or more programs stored in the memory. The graphical user interface includes user interfaces displayed in accordance with any of the methods described herein.

In accordance with some implementations, a method is performed at an electronic device with a touch-sensitive surface and a display. The method includes displaying a first chart on the display. The first chart concurrently displays a first set of categories and each respective category has a corresponding visual mark displayed in the first chart. The method further includes detecting a first touch input at a location on the touch-sensitive surface that corresponds to a location on the display of a first visual mark for a first category in the first chart, and, in response to detecting the first touch input, removing the first category and the first visual mark from the first chart via an animated transition, and updating display of the first chart. The first visual mark moves in concert with movement of a finger contact in the first touch input during at least a portion of the animated transition.

Thus, electronic devices with displays and touch-sensitive surfaces are provided with faster, more efficient methods and interfaces for data visualization, thereby increasing the effectiveness, efficiency, and user satisfaction with such devices. Such methods and interfaces may complement or replace conventional methods for data visualization.

BRIEF DESCRIPTION OF THE DRAWINGS

FIG. 6 illustrates aspects of three interaction profiles, in accordance with some implementations.

FIG. 7 shows an abstracted version of the chart types model, in accordance with some implementations.

FIG. 8 shows a diagrammatic version of a tool based on visual variables, in accordance with some implementations.

Figure 1:
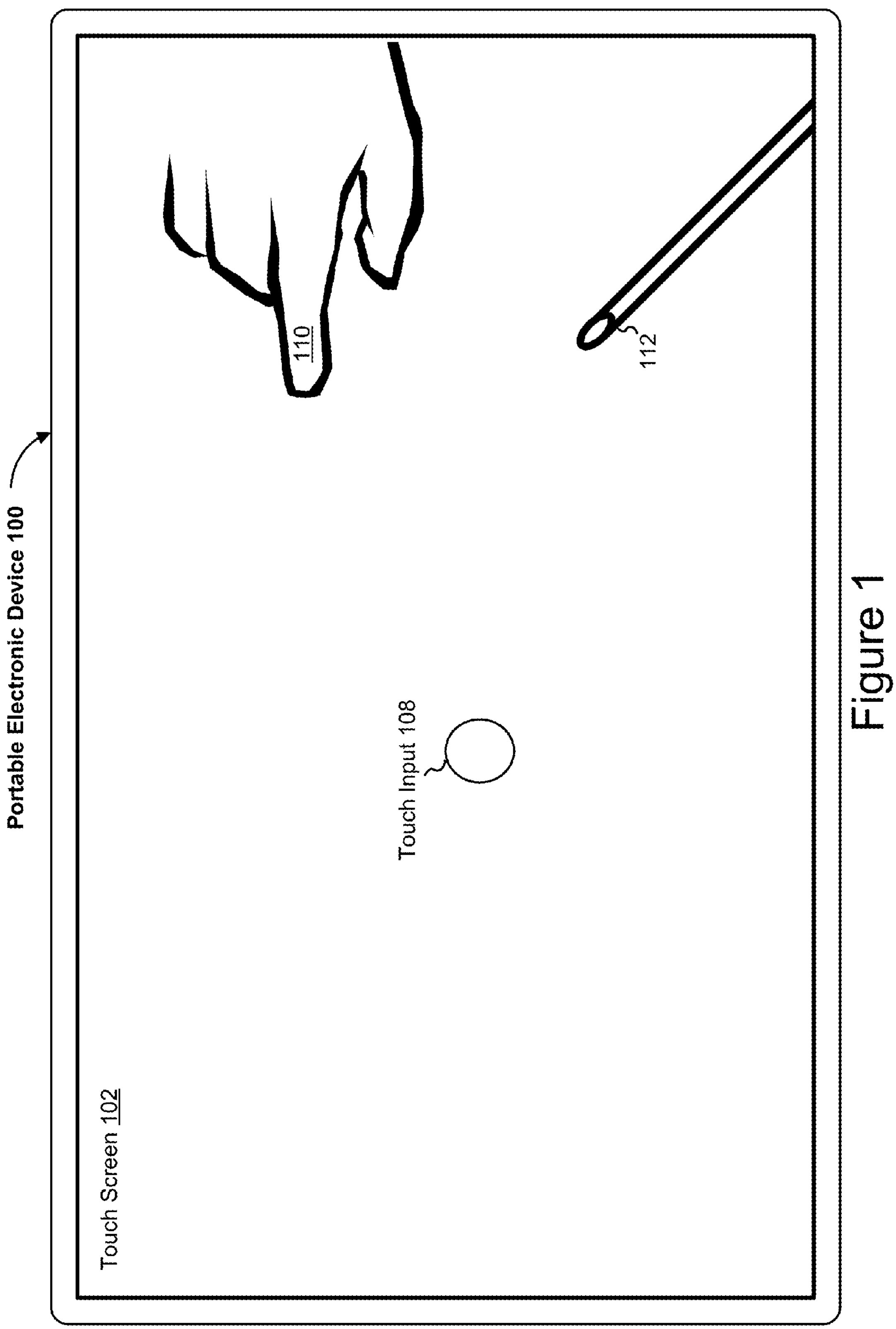
FIG. 1 illustrates a portable electronic device having a touch screen, in accordance with some implementations.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system or device.

Reference will now be made to various implementations, examples of which are illustrated in the accompanying drawings. In the following detailed description, numerous specific details are set forth in order to provide a thorough understanding of the invention and the described implementations. However, the invention may be practiced without these specific details. In other instances, well-known methods, procedures, components, and circuits have not been described in detail so as not to unnecessarily obscure aspects of the implementations.

DESCRIPTION OF IMPLEMENTATIONS

As portable electronic devices become more compact, and the number of functions performed by applications on any given device increase, it has become a significant challenge to design user interfaces that allow users to interact with the applications easily. This challenge is particularly significant for portable devices with smaller screens and/or limited input devices. In addition, data visualization applications need to provide user-friendly ways to explore data in order to enable a user to extract significant meaning from a particular data set. Some application designers have resorted to using complex menu systems to enable a user to perform desired functions. These conventional user interfaces often result in complicated key sequences and/or menu hierarchies that must be memorized by the user and/or that are otherwise cumbersome and/or not intuitive to use.

The methods, devices, and graphical user interfaces described herein make manipulation of data sets and data visualizations more efficient and intuitive for a user. A number of different intuitive user interfaces for data visualizations are described below. For example, a user specifies an interaction profile, and based on that profile the user interface responds to user input in ways that are specifically tuned for a particular type of data analysis.

Attention is now directed toward implementations of portable devices with touch-sensitive displays. Implementations of electronic devices and user interfaces for such devices are described. In some implementations, the device is a portable communications device, such as a mobile telephone, that also contains other functions, such as PDA and/or music player functions. Other portable electronic devices, such as laptops or tablet computers with touch-sensitive surfaces (e.g., touch screen displays and/or touch pads), are, optionally, used. It should also be understood that, in some implementations, the device is not a portable communications device, but is a desktop computer with a touch-sensitive surface (e.g., a touch screen display and/or a touch pad). In the discussion that follows, an electronic device that includes a display and a touch-sensitive surface is described. It should be understood, however, that the electronic device optionally includes one or more other physical user-interface devices, such as a physical keyboard, a mouse, a microphone, and/or a joystick.

FIG. 1 illustrates a portable electronic device 100 having a touch screen 102, in accordance with some implementations. In some implementations, the device 100 is a mobile phone, a laptop computer, a personal digital assistant (PDA), or a tablet computer. The touch screen 102 is also sometimes called a touch-sensitive display and/or a touch-sensitive display system. The touch screen 102 optionally displays one or more graphics within a user interface (UI). In some implementations, a user is enabled to select one or more of the graphics by making a touch input (e.g., a touch input 108) on the graphics. In some instances, the touch input is a contact on the touch screen. In some instances, the touch input is a gesture that includes a contact and movement of the contact on the touch screen. In some instances, the gesture optionally includes one or more taps, one or more swipes (e.g., from left to right, right to left, upward, and/or downward) and/or a rolling of a finger (e.g., from right to left, left to right, upward, and/or downward) that has made contact with the device 100. For example, a touch input on the graphics is optionally made with one or more fingers 110 (not drawn to scale in the figure) or one or more styluses 112 (not drawn to scale in the figure). In some implementations, selection of one or more graphics occurs when the user breaks contact with the one or more graphics. In some circumstances, inadvertent contact with a graphic does not select the graphic. For example, a swipe gesture that sweeps over a visual mark optionally does not select the visual mark when the gesture corresponding to selection is a tap. The device 100 optionally also includes one or more physical buttons and/or other input/output devices, such as a microphone for verbal inputs.

Figure 2:
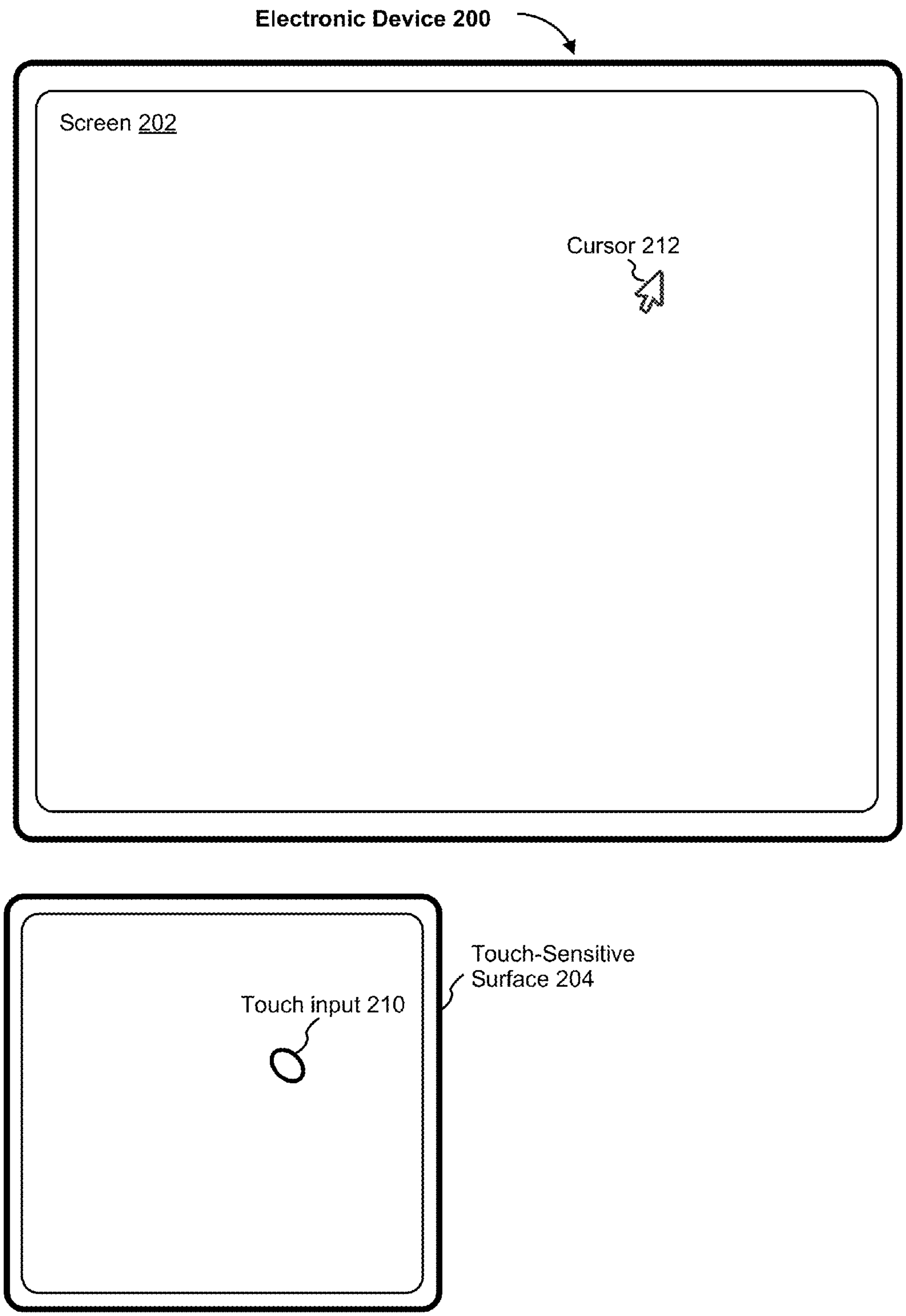
FIG. 2 illustrates a portable electronic device having a touch-sensitive surface that is separate from the display, in accordance with some implementations.

FIG. 2 illustrates an electronic device 200 in accordance with some implementations. The device 200 need not be portable. In some implementations, the device 200 is a laptop computer, a desktop computer, a tablet computer, or an educational device. The device 200 includes a screen 202 and a touch-sensitive surface 204. The screen 202 optionally displays one or more graphics within a UI. In some implementations, a user is enabled to select one or more of the graphics by making a touch input (e.g., a touch input 210) on the touch-sensitive surface 204 such that a corresponding cursor (e.g., a cursor 212) on the screen 202 selects the one or more graphics. For example, when an input is detected on the touch-sensitive surface 204 while the cursor 212 is over a particular user interface element (e.g., a button, a window, a slider, or another user interface element), the particular user interface element is adjusted in accordance with the detected input.

Figure 3A:
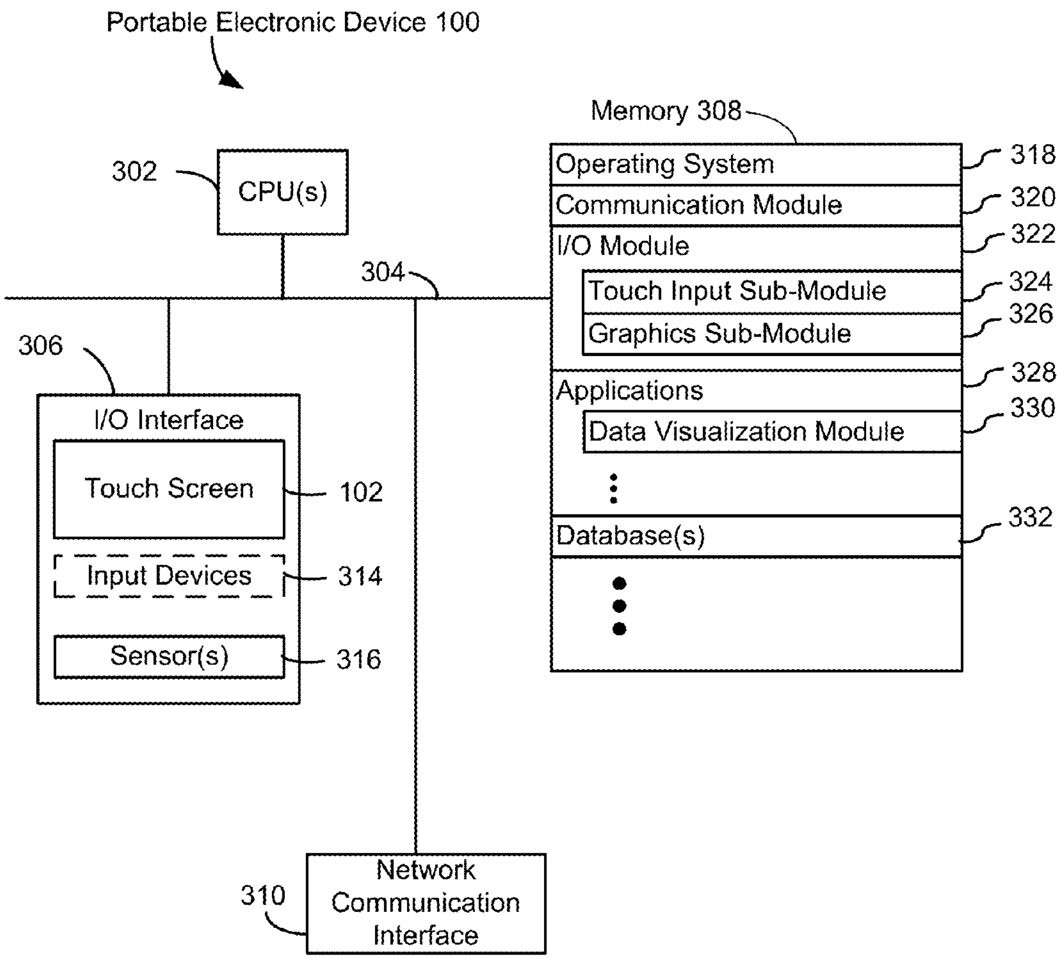
FIG. 3A is a block diagram illustrating a portable electronic device having a touch screen, in accordance with some implementations.

FIG. 3A is a block diagram illustrating a portable electronic device 100, in accordance with some implementations. It should be appreciated that the device 100 is only one example of a portable electronic device, and that the device 100 optionally has more or fewer components than shown, optionally combines two or more components, or optionally has a different configuration or arrangement of the components. The various components shown in FIG. 3A are implemented in hardware, software, firmware, or a combination of hardware, software, and/or firmware, including one or more signal processing and/or application specific integrated circuits.

The device 100 includes one or more processing units (CPU's) 302, an input/output (I/O) subsystem 306, memory 308 (which optionally includes one or more computer readable storage media), and a network communication interface 310. These components optionally communicate over one or more communication buses or signal lines 304. The communication buses 304 optionally include circuitry (sometimes called a chipset) that interconnects and controls communications between system components.

The memory 308 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. The memory 308 optionally includes one or more storage devices remotely located from the processor(s) 302. The memory 308, or alternately the non-volatile memory device(s) within the memory 308, comprises a non-transitory computer readable storage medium.

In some implementations, the software components stored in the memory 308 include an operating system 318, a communication module 320, an input/output (I/O) module 322, and applications 328. In some implementations, one or more of the various modules comprises a set of instructions in the memory 308. In some implementations, the memory 308 stores one or more data sets in one or more database(s) 332.

The operating system 318 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware, software, and/or firmware components.

The communication module 320 facilitates communication with other devices over one or more external ports and also includes various software components for handling data received from other devices.

The I/O module 322 includes a touch input sub-module 324 and a graphics sub-module 326. The touch input sub-module 324 optionally detects touch inputs on the touch screen 102 or other touch sensitive devices (e.g., a touchpad or physical click wheel). The touch input sub-module 324 includes various software components for performing various operations related to detection of a touch input, such as determining if contact has occurred (e.g., detecting a finger-down event), determining if there is movement of the contact, tracking the movement across the touch-sensitive surface (e.g., detecting one or more finger-dragging events), and determining if the contact has ceased (e.g., detecting a finger-up event or a break in contact). The touch input sub-module 324 receives contact data from the touch-sensitive surface (e.g., the touch screen 102). These operations are, optionally, applied to single touch inputs (e.g., one finger contacts) or to multiple simultaneous touch inputs (e.g., "multitouch"/multiple finger contacts). In some implementations, the touch input sub-module 324 detects contact on a touchpad.

The touch input sub-module 324 optionally detects a gesture input by a user. Different gestures on the touch-sensitive surface have different contact patterns. Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an data mark). As another example, detecting a finger swipe gesture on the touch-sensitive surface includes detecting a finger-down event followed by detecting one or more finger-dragging events, and subsequently followed by detecting a finger-up (lift off) event.

The graphics sub-module 326 includes various known software components for rendering and displaying graphics on the touch screen 102 or other display, including components for changing the visual impact (e.g., brightness, transparency, saturation, contrast or other visual property) of graphics that are displayed. As used herein, the term "graphics" includes any object that can be displayed to a user, including without limitation data visualizations, icons (such as user-interface objects including soft keys), text, digital images, animations and the like. In some implementations, the graphics sub-module 326 stores data representing graphics to be used. Each graphic is, optionally, assigned a corresponding code. The graphics sub-module 326 receives, in some implementations, one or more codes specifying graphics to be displayed along with, if necessary, coordinate data and other graphic property data, and then generates screen image data to output to the display or touch screen.

The applications 328 optionally include a data visualization module 330 for displaying graphical views of data and one or more other applications. Examples of other applications include word processing applications, email applications, and presentation applications.

In conjunction with the I/O interface 306, including the touch screen 102, the CPU(s) 302, and/or the database(s) 332, the data visualization module 330 includes executable instructions for displaying and manipulating various graphical views of data.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures, or modules, and thus various subsets of these modules may be combined or otherwise re-arranged in various implementations. In some implementations, the memory 308 stores a subset of the modules and data structures identified above. Furthermore, in some implementations, the memory 308 stores additional modules and data structures not described above.

Figure 3B:
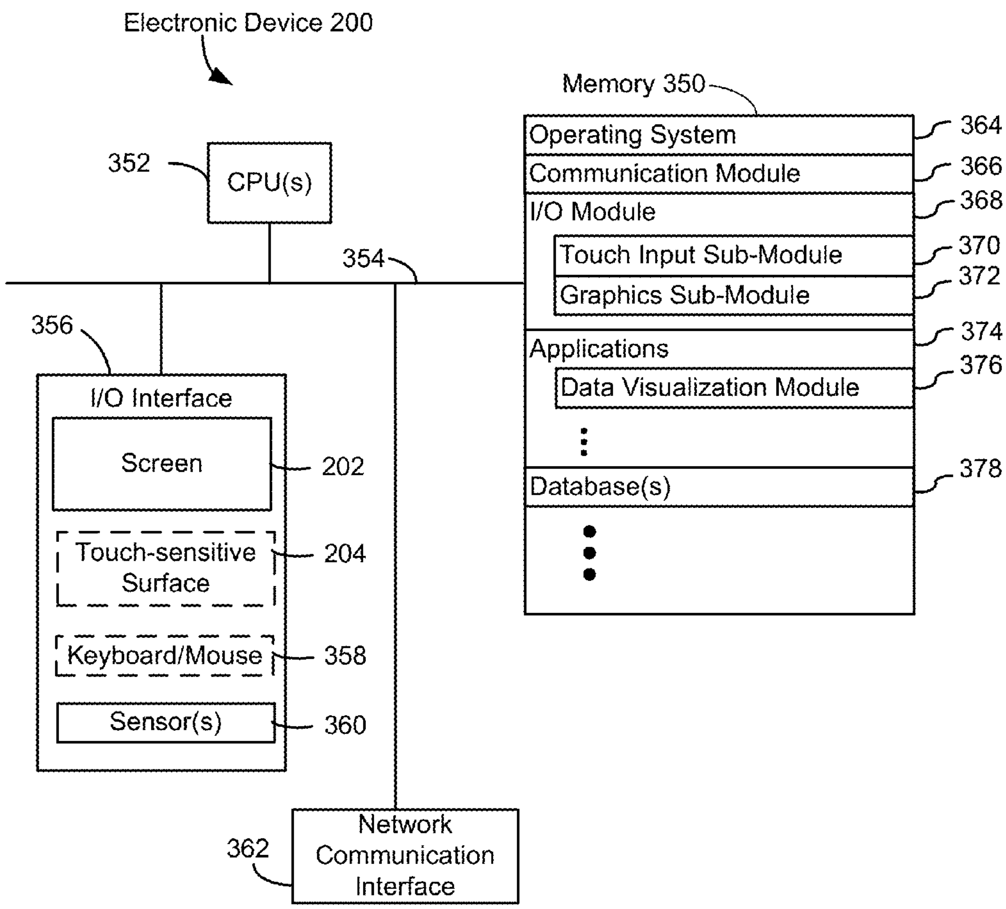
FIG. 3B is a block diagram illustrating a portable electronic device having a touch-sensitive surface, in accordance with some implementations.

FIG. 3B is a block diagram illustrating an electronic device 200, in accordance with some implementations. It should be appreciated that the device 200 is only one example of a electronic device, and that the device 200 optionally has more or fewer components than shown, optionally combines two or more components, or optionally has a different configuration or arrangement of the components. The various components shown in FIG. 3B are implemented in hardware, software, or firmware, or a combination of hardware, software, and/or firmware, including one or more signal processing and/or application specific integrated circuits.

The device 200 typically includes one or more processing units/cores (CPUs) 352, one or more network or other communication interfaces 362, memory 350, an I/O interface 356, and one or more communication buses 354 for interconnecting these components. The communication buses 354 optionally include circuitry (sometimes called a chipset) that interconnects and controls communications between system components.

The I/O interface 356 comprises a screen 202 (also sometimes called a display), a touch-sensitive surface 204, and one or more sensor(s) 360 (e.g., optical, acceleration, proximity, and/or touch-sensitive sensors). The I/O interface 356 optionally includes a keyboard and/or mouse (or other pointing device) 358. The I/O interface 356 couples input/output peripherals on the device 200, such as the screen 202, the touch-sensitive surface 204, other input devices 358, and one or more sensor(s) 360, to the CPU(s) 352 and/or to the memory 350.

The screen 202 provides an output interface between the device and a user. The screen 202 displays visual output to the user. The visual output optionally includes graphics, text, icons, data marks, or any combination thereof (collectively termed "graphics"). In some implementations, some or all of the visual output corresponds to user-interface objects. The screen 202 optionally uses LCD (liquid crystal display) technology, LPD (light emitting polymer display) technology, or LED (light emitting diode) technology, although other display technologies are used in other implementations.

In addition to the touch screen, the device 200 includes a touch-sensitive surface 204 (e.g., a touchpad) for detecting touch inputs. The touch-sensitive surface 204 accepts input from the user via touch inputs. For example, a touch input 210 in FIG. 2. The touch-sensitive surface 204 (along with any associated modules and/or sets of instructions in the memory 350) detects touch inputs and converts the detected inputs into interaction with user-interface objects (e.g., one or more icons, data marks, or images) that are displayed on the screen 202. In an exemplary implementation, a point of contact between the touch-sensitive surface 204 and the user corresponds to a finger of the user.

The memory 350 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. The memory 350 optionally includes one or more storage devices remotely located from the CPU(s) 352. In some implementations, the software components stored in the memory 350 include an operating system 364, a communication module 366, an input/output (I/O) module 368, and applications 374. In some implementations, one or more of the various modules comprises a set of instructions in the memory 350. In some implementations, the memory 350 stores one or more data sets in one or more database(s) 378. In some implementations, the I/O module 368 includes a touch input sub-module 370 and a graphics sub-module 372. In some implementations, the applications 374 include a data visualization module 376.

In some implementations, the memory 350 stores programs, modules, and data structures analogous to the programs, modules, and data structures stored in the memory 308 of portable electronic device 100 (FIG. 3A), or a subset thereof. Furthermore, the memory 350 optionally stores additional programs, modules, and data structures not present in the memory 308 of the portable electronic device 100. For example, the memory 350 of the device 200 optionally stores drawing, presentation, and word processing applications, while the memory 308 of the portable electronic device 100 (FIG. 3A) optionally does not store these modules.

The device 200 also includes a power system for powering the various components. The power system optionally includes a power management system, one or more power sources (e.g., a battery or an alternating current (AC) source), a recharging system, a power failure detection circuit, a power converter or inverter, a power status indicator (e.g., a light-emitting diode (LED)) and any other components associated with the generation, management, and distribution of power in portable devices.

Each of the above identified elements in FIG. 3B is, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various implementations. In some implementations, the memory 350 optionally stores a subset of the modules and data structures identified above. Furthermore, the memory 350 optionally stores additional modules and data structures not described above.

When switching between interaction profiles, the system typically makes some automatic adjustments to the selected set of data fields. For example, the data fields that define the categories in category world are not shared with time world, and the date/time field used in time world is not shared with category world. One way to think about the relationship is that there are multiple "analytic roles," each of which can be used by any interaction profile if the profile can make sense of that analytic role. For example, the "numeric summary" (or "measure") analytic role can be shared by all three of the worlds. However, the "date/time ordinal" analytic role only makes sense in time world, so it is not shared by any of the other worlds. Note the distinction here between data fields and the analytic roles played by each of the data fields. Typically, a data field whose data type is a character string is used as a dimension (e.g., a category), whereas numeric data fields are used as measures. However, this is not always true. An analytic role specifies how a data field is currently being used. In fact, it is possible for a single data field to have multiple analytic roles at the same time in the same data visualization. For example, a numeric field can be used in a categorical analytic role via binning (e.g., grouping data records into a finite set of interval ranges), and simultaneously used in a numerical summary analytic role using an aggregation function such as SUM).

The data visualization community has made enormous progress in exploring, cataloguing, and validating the large space of data visualization techniques. In many cases, given a data set and an analysis task or set of tasks, a visualization expert can confidently recommend a design that is well suited to it. Furthermore, general-purpose visualization tools (e.g., Tableau) allow users to rapidly create almost any visualization design, giving analysts the ability to ask and answer novel sets of questions in succession by building and adjusting views of data. These tools achieve support for an extraordinarily broad range of data views by organizing the user interface in a way that mimics the structure of data visualization theory. For example, some systems allow users to specify a mapping from data fields to visual variables such as x-position, y-position, size, color, and text. Systems may also support custom mapping functions (e.g. logarithmic), layout algorithms (e.g. radial and treemap), and statistical features (e.g. trend lines, clusters, and inferences).

However, most data analysts are not visualization experts. This is increasingly true as data continues to proliferate and analysis tools become more accessible to the wider public. These analysts have important questions to ask of their data: they want to understand patterns, find outliers, validate hypotheses, and make better-informed decisions. But they are not familiar with visualization theory or best practices, nor do they want to be. Data visualization just happens to be the best way to answer many of their questions. Moreover, the most common analytical questions only require a small set of basic visualization types, particularly when those basic views can be linked together and enhanced with interactivity.

In other words, data analysts are well-served by the disclosed implementations of visual analysis tools that are organized around analysis tasks rather than visualization properties. By design, this model does not include every conceivable visualization or statistical graphic. However, it does support the vast majority of analytic questions, and it allows analysts to answer those questions significantly faster than existing general-purpose tools. In addition, this model makes it much easier for users to access deep statistical functionality that is optimized around each analytic subtask.

Figure 4:
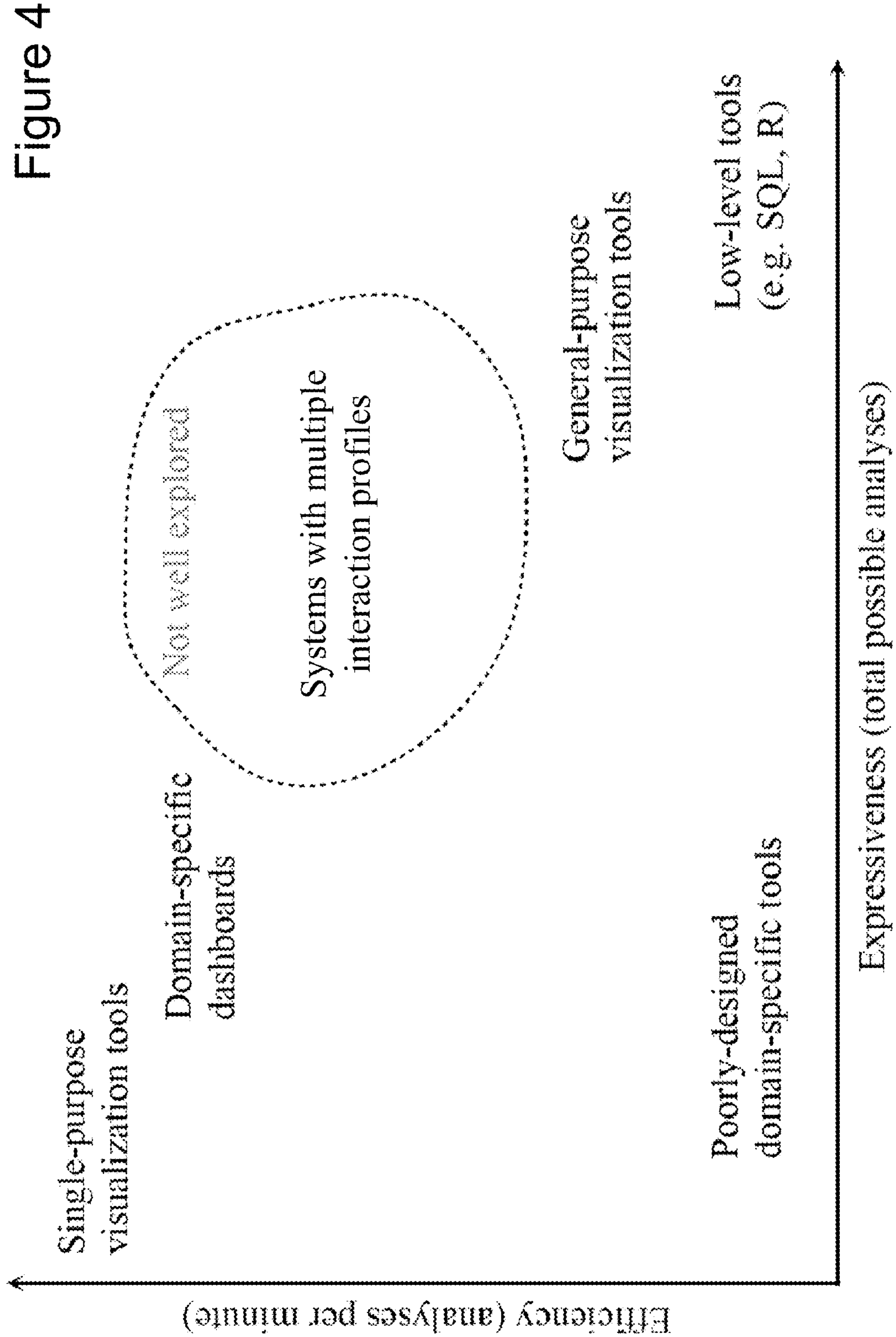
FIG. 4 illustrates the spectrum of data visualization tools based on expressiveness and efficiency.

FIG. 4 illustrates the spectrum of expressiveness versus efficiency for visualization tools. The model used by many existing general-purpose visualization systems enables combinatorial power for practically infinite visualizations, but it also puts considerable burdens on the data analyst. In order to answer every new question, analysts must: (1) know what types of visualizations are possible; (2) design appropriate visualizations that adequately answer each question; and (3) construct each visualization using the general-purpose tools of visual variables, layout algorithms, and statistical methods.

As a simple example, consider a user that wants to understand how her business's sales are growing over time. She must first recognize that a horizontal line chart is likely the best design. Then she must determine how to build that design by mapping an appropriate date field and sales field to the correct axes, potentially also adding a redundant color encoding on sales. When that initial task is done, she notices a spike in March and wants to understand why. Which products were sold more than usual? Now she must design a visualization or set of visualizations that additionally partition the data by product. She might try a sorted bar chart of products filtered just to March, and compare it to the same chart filtered to the entire past year. Or she might try calculating the percent difference in sales over time of each product and visualizing a subset of the results. In each case, she has to know what visualizations are possible, design them, and reduce them to the set of visualization primitives understood by the system. All of these tasks require significant training to master, and all are tangential to her core task of answering simple questions (e.g., "How are my sales doing, and why?").

On the other end of the spectrum, purpose-built visualization tools require little or no training on the part of the analyst and provide answers extremely quickly. For example, consider a purpose-built sales dashboard with a timeline of sales over time, key metrics, and linked bar charts that allow interactive filtering to dates and product categories. Users can learn how to use the interactive widgets within seconds, and they do not need to learn visualization theory or design visualizations in order to answer questions that fall within the scope of the dashboard. On the other hand, questions that were not anticipated by the dashboard builder usually remain out of reach. A user is limited to a very specific interface.

In the universe of system models, there is a desire both for expressiveness (completeness, generalizability) and efficiency (speed of learning and using the tool). As outlined above, the two ends of that spectrum have been well explored. Disclosed implementations here explore the middle area. Specifically, by giving up a small amount of expressiveness, implementations gain in efficiency of use.

A general-purpose visual analysis tool must be able to specify, in some way, three aspects of a visualization: (1) what data variables to use; (2) how to transform those variables (for example, by aggregating or binning); and (3) what visual design to use. At least three user interface models have been explored to accomplish this, each with distinct tradeoffs in flexibility and usability.

Model I—visual variables. Systems based on visualization theory allow users to transform and map data fields directly to visual variables such as x-position, color, and size. These declarative specifications are usually easier to create and modify than lower-level procedural techniques, while remaining very expressive. Some tools include interactive variables such as actions for selecting and brushing across views (e.g., Tableau). Some tools also include template systems (e.g., Tableau's ShowMe) that help users more easily construct common visualizations. However, such systems require the user to have some expertise in designing and building views that adequately answer a given analytic question. In contrast, disclosed implementations provide a simpler model that more directly supports common analytic questions.

Model II—recommendation systems. In this model, heuristics and/or statistical techniques are used to construct visualizations in response to partially-specified input. For example, in some systems the user chooses data fields and the system chooses one or more visualizations that incorporate those fields. Conversely, cognostic tools let a user specify a visual pattern of interest (e.g. "stringy"), while the system automatically finds and presents data that most closely matches the pattern. Tools in this category handle some of the work of exploring the data set and/or creating effective visualizations. However, because the input is ambiguous with respect to the user's analytic task, recommendation engines must guess which chart(s) will be most suitable. Some systems present many alternatives at once, which increases the likelihood that the needed visualization will be shown (and encourages exploration). However, the tradeoff is that the user must search through many charts and still might not find an appropriate one. In contrast, disclosed implementations provide a deterministic model where user input maps directly to output and no guessing is necessary.

Model III—expert systems. "Chart wizards" and more sophisticated expert systems ask the user a series of questions about what data to use, what goals to achieve, and/or what visuals to produce. At the end of the process, the resulting visualization(s) are presented. Many of these systems can be used by a wide audience without visualization expertise. However, it takes a relatively long time to create each new analysis because users must go through the entire specification process again. This problem is exacerbated in systems that require a lengthy or cognitively demanding transcription. In contrast, disclosed implementations provide a model where visualizations can be shown immediately and the analysis can be iteratively refined.

In summary, there are three key properties of interest to be found in existing models for general-purpose visualization. Namely, systems based on visual variables allow deterministic specification of a combinatoric space of views. Recommendation systems and expert systems support users who do not have expertise in designing visualizations. And some expert systems map user goals to views that meet those goals. Disclosed implementations provide a model that combines all three of these properties.

In disclosed implementations, users modify analytic variables that are capable of expressing a wide range of common analytic questions. These analytic variables are chosen such that: (a) they are easily understood by analysts; (b) they deterministically map to visualizations that satisfy the analytic task; and (c) they can be iteratively specified and explored via a direct manipulation user interface. Disclosed implementations are modeled based on analytic task properties rather than visual properties.

In addition, many visualization options, statistical techniques, and user interaction methods are only useful for a narrow subset of analytic questions. For example, stacked bar charts work well for sums but are meaningless for averages. Forecasting techniques only apply to time-series. And user operations such as zooming and panning are critical in some contexts but useless in others.

As illustrated in FIGS. 5A-5D, disclosed implementations tackle these problems by organizing the user interface around analytic questions rather than visual specifications. For example, rather than specify that "Order Date" is on the horizontal axis, "Sum of Sales" is on the vertical axis, and "Region" is on color, a user selects time-based analysis, selects "Sum of Sales" as the metric of interest, and splits the data by "Region". The time world user interface automatically and fluidly converts this task-oriented specification into a beautiful, interactive visualization space optimized for time-based analysis of partitioned sum aggregations. The user can interact with the timeline and apply time-based statistics, time-based filters, and time-based selection and annotation tools. Moreover, the interface is free of tools or options that are irrelevant or misleading for the task at hand.

FIGS. 5A-5D illustrate four interaction profiles known as category world, time world, geography world, and correlation world. Based on the interaction profile selected and the data fields selected, appropriate data visualizations are generated. In addition, if a user switches to a different interaction profile, the user interface is updated, and a new data visualization created based on the new selection.

Data visualization and analysis tools have gotten substantially easier to use in recent decades, but analysts wishing to explore fresh data sets are still faced with significant hurdles. For each new question, the analyst must design an appropriate visualization, build that visualization using a visual algebra, and then verify any conclusions by identifying and running an appropriate statistical test. To do this well requires substantial expertise in both visualization theory and statistics. Disclosed implementations provide a new model for general-purpose visual analysis called data worlds. Like sandwich, pizza, and sushi stations at a food market, this model splits the space of data analysis into a small number of richly interactive "worlds" that are tailored specifically to categorical, temporal, or geographical analysis. The description below demonstrates some of the ways in which the data worlds model makes data analysis substantially faster and easier. This model scales up to support a very wide range of analytic questions.

There already exist excellent, popular user interfaces that are tuned for helping people see and understand geographic data. One can search for restaurants or other places of interest, and easily zoom in or out of the map with a pinch gesture while the visualization updates in real time, always showing information that's appropriate for the given zoom level. One can tap on points of interest to get more details on demand, such as restaurant ratings and reviews. And one has convenient access to advanced computations such as the driving directions that identify the shortest or fastest path to a destination.

Disclosed implementations provide tailored spaces like this for doing other types of data analysis. For example, a space tailored for time-series analysis lets a user easily zoom into the year, month, week, day, and down to individual hourly observations. It lets a user tap on a month or day of interest, and get details on demand such as the average, minimum, and maximum temperature. It lets a user go even deeper to compare this August with the previous August and see that it's 7% warmer. And all of these features are an easy tap or swipe away because the interaction is tailored to answering temporal questions about data.

Similarly, implementations provide another space that is tailored for the most basic type of information—categorical data. It lets a user easily filter out or keep only specific categories of interest. It lets a user get more details on demand by adding columns and accessing the underlying data. It even lets a user zoom into the more abstract space of nested categorical fields, breaking apart aggregated bars into their more detailed constituents.

Some implementations refer to these different spaces data worlds. Each world is designed around a cluster of important data questions that can be answered using a common visualization structure. Three clusters that emerged most clearly from the research are the three outlined above and shown in FIG. 6: categorical, temporal, and geographical analysis. Categorical analysis concerns who or what is winning or losing or doing best or worse along some metric. This world is formed around the basic structure of a bar chart. Temporal or time-series analysis asks questions about when important events occurred and what the trend over time looks like. The visualization type supporting these questions is a time line. And of course, geographical analysis uses a map to answer questions about which regions are interesting by some metric across two-dimensional space.

Figure 5A:
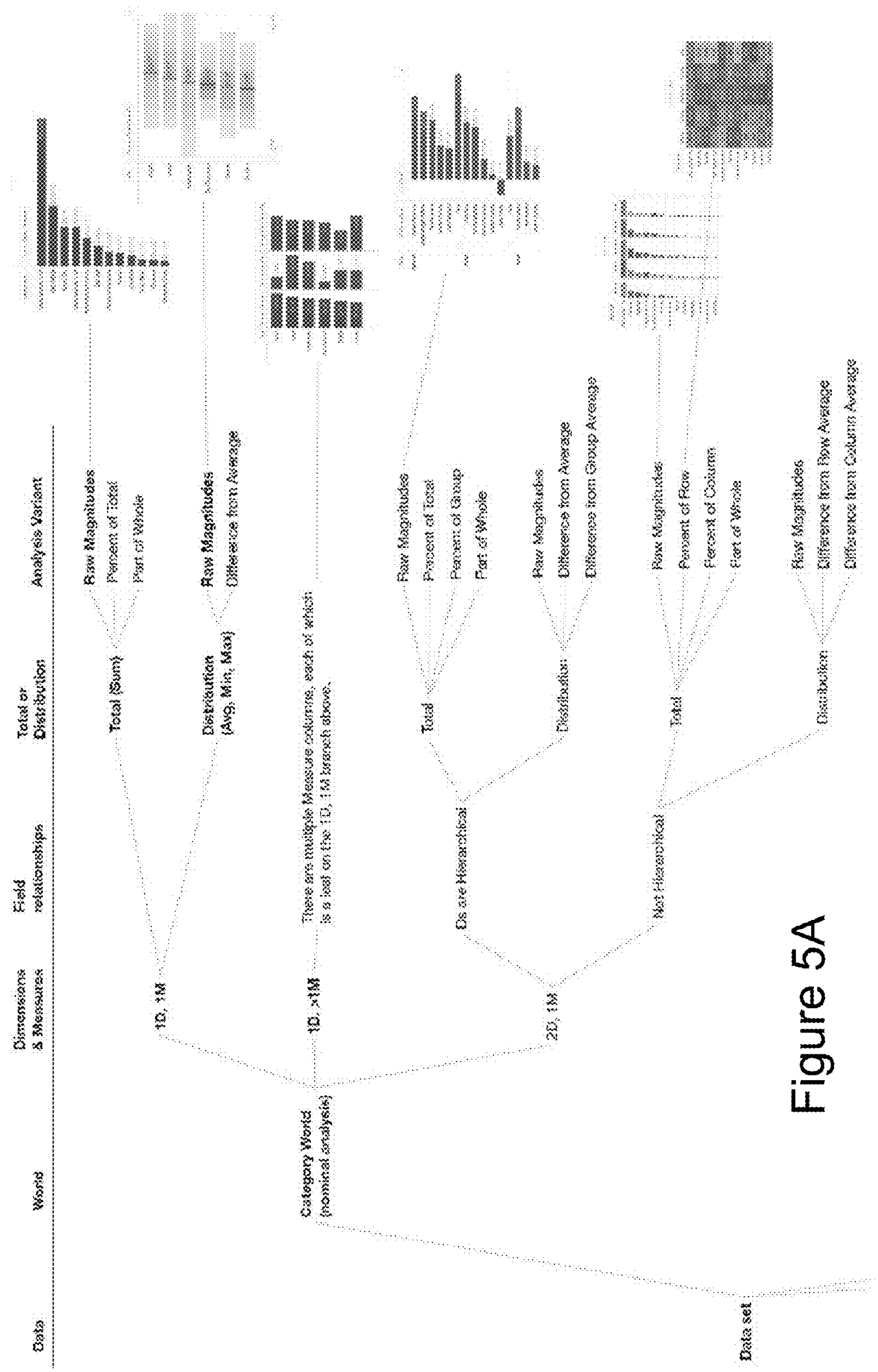
FIGS. 5A-5D identify some of the differences between the interaction profiles for Category world, Time world, Geography world, and Correlation world, in accordance with some implementations.
Figure 5B:
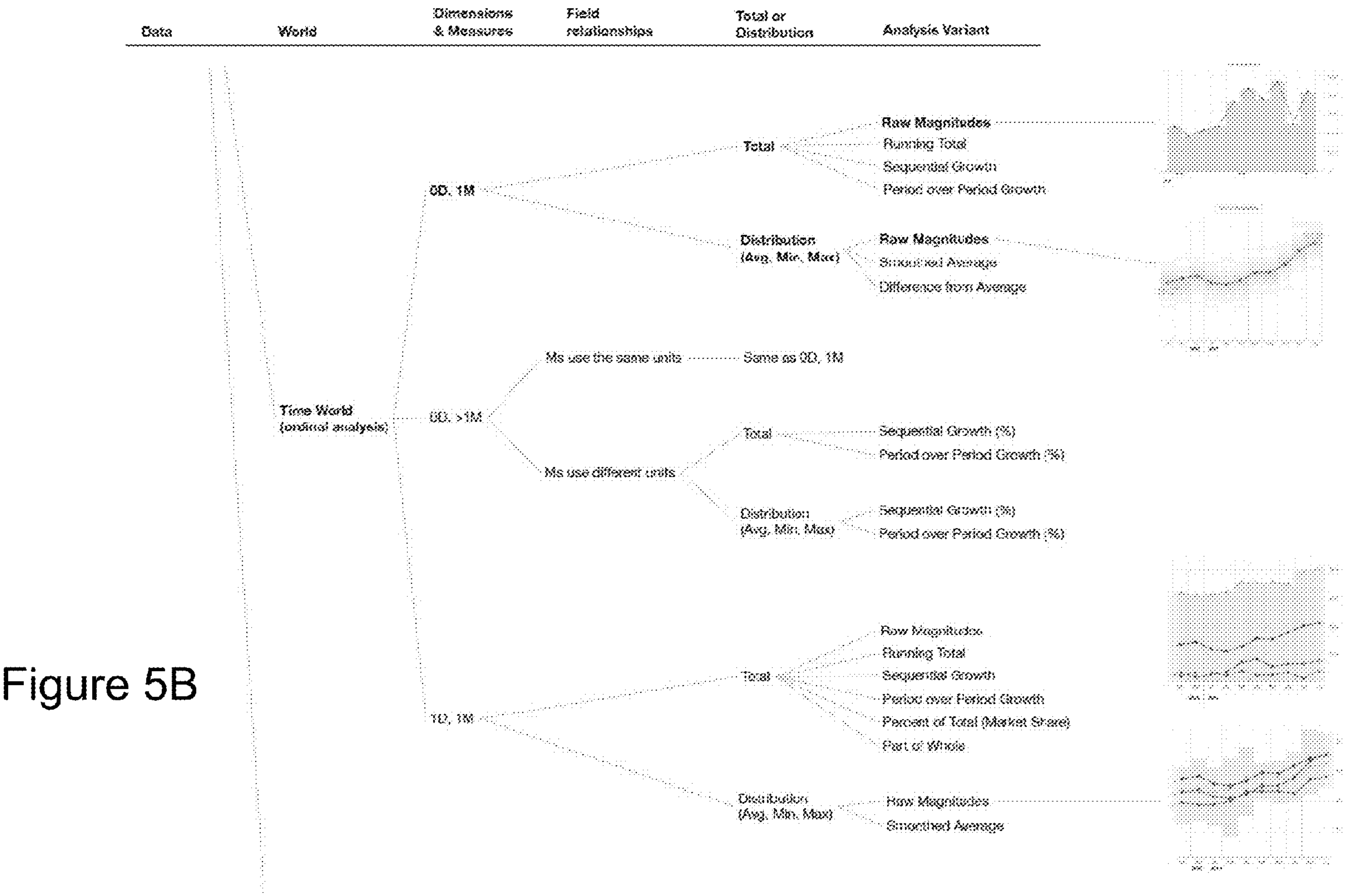
Figure 5C:
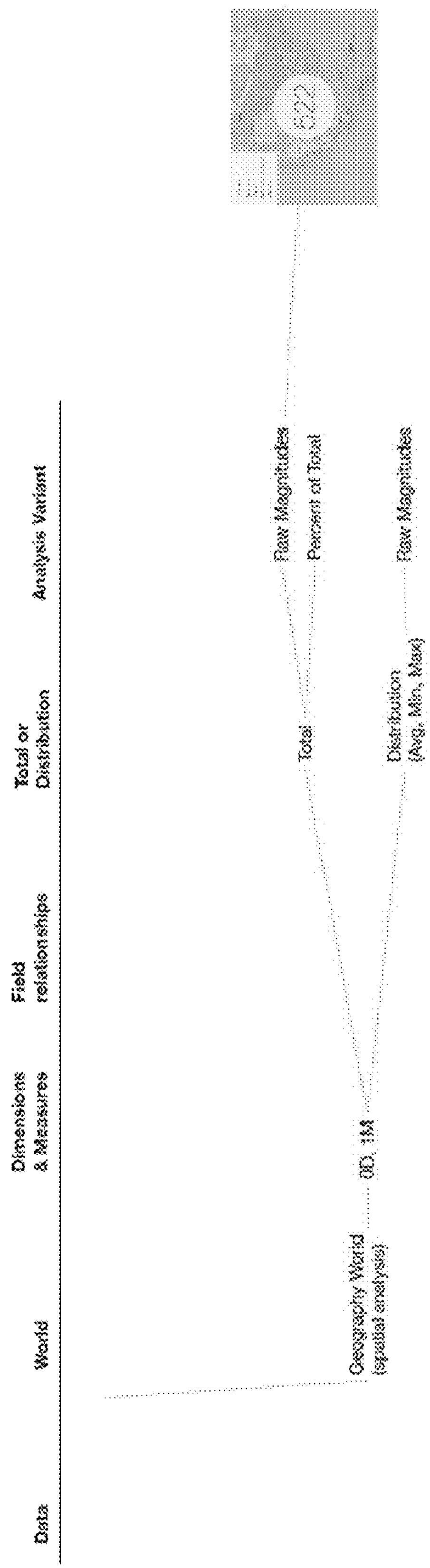
Figure 5D:
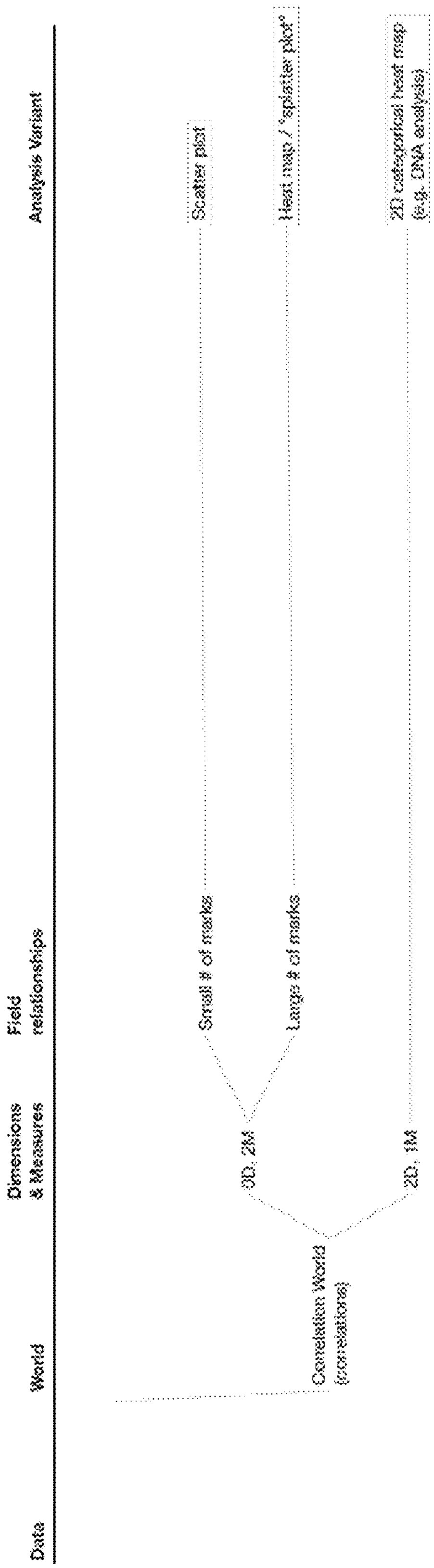

There are more such clusters as well, such as correlation world illustrated in FIG. 5D and relationship world, which is used to show relationships within a network. Each of these worlds answers a much deeper set of questions than the few examples outlined so far. This methodology is different from the visual analysis tools that have previously been available.

Defined broadly, information architecture refers to the conceptual structure or model behind any design. In the words of Bret Victor, "breaking down a complex thing into understandable chunks is essential for understanding, perhaps the essence of understanding." The way in which a system is split into components has huge implications for how the system is used and how easy it is to use.

As an example, consider how sandwiches are sold. Some shops have a set of pre-made sandwiches that can be quickly selected. There are a limited set of sandwiches, but it is very easy to pick one, and it is fast to check out because they're all pre-made and ready to go. Other shops use the alternative model of "build your own" sandwich. A person can choose from among many variables—bread, cheese, toppings, and so on—which makes it possible to construct many thousands of unique sandwiches. However, some of these possibilities taste terrible. It is up to the buyer to design a good one. Also, each sandwich has to be custom-built, which takes time, so a long line might form. This analogy can be useful for understanding the disclosed data visualization methodology.

Historically, one commonly used model for data visualization is based on chart types. In this model, a user picks from a long list of chart variants, and then the process is essentially done. This is analogous to pre-made sandwiches. It's easy to understand and quite fast to use. Some spreadsheet applications implement a version of this model. For example, there may be 73 chart types in all, split into seven sections (one of which is "Other"). Some of these chart types are very similar to each other, and when looking through them it is difficult to understand the variants or understand why a specific variant should be used. Since each variant is listed individually, it is clear that this model does not scale beyond a certain limit. A user cannot reasonably search through a list with thousands of different chart types.

FIG. 7 shows an abstracted version of the chart types model. A user chooses the chart type up front, and then perhaps picks which data to use in the chart. And that's all. This model is easy to understand and fast to use, but it faces problems when scaling up to a larger set of chart variants. It also does not support the ability to move directly from one chart to a different but related view. Such a capability is needed in data analysis sessions where answers to one question often lead to new, related questions. In the chart types model, a person always has to go back to the beginning and choose a new chart.

Another model used by many general-purpose data visualization applications is based on visual variables. The variables can be used in combination to describe a very large set of visualizations. For example, some applications use shelves to specify visual variable for the horizontal position, color, or size, and a visualization is built by assigning data fields to one or more of these visual variables. This is analogous to the "build-your-own sandwich" model. This model has key advantages such as the opportunity for creativity and the fact that it scales to cover a very large set of possible visualizations.

FIG. 8 shows a diagrammatic version of a tool based on visual variables. There is essentially just one space, and within it a person adjusts the variables as much as desired. The gray circle represents the ability to move easily from any view to any other related view, supporting the "flow of analysis" as new questions arise. The downside of this flexibility is that users have to design and build a new custom visualization every time they want to answer a question.

As an example, suppose a user is analyzing data from a health and fitness competition where participants scored points for doing certain activities. The analyst wants to answer a basic question: How did the total number of points scored change over time? In other words, did participants score a lot of their points at the beginning of the challenge, or at the end, or in some other pattern?

Figure 9:
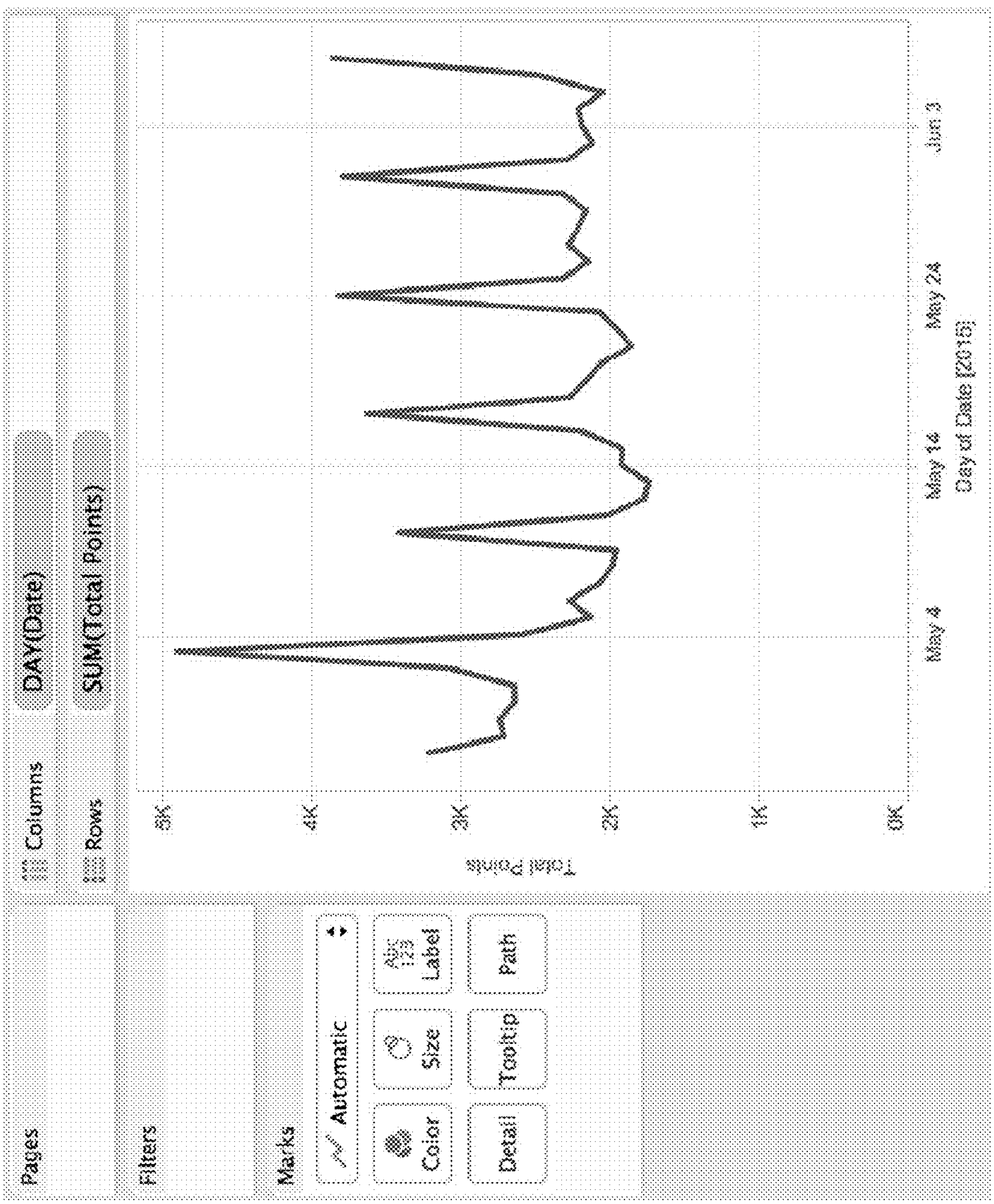
FIG. 9 illustrates a line chart data visualization, in accordance with some implementations.

An experienced user of the Tableau platform can answer this question fairly quickly by putting the "Points" field on the shelf that corresponds to vertical positioning and the "Date" field on the shelf that corresponds to horizontal positioning. The user then specifies that the "Date" field should group the data into individual days and should show results on a quantitative axis. The resulting visualization shows that the most points were scored during the first weekend of the fitness competition, and to a lesser degree on subsequent weekends. This is illustrated in FIG. 9.

But consider what the analyst needs to know in order to answer her question. First, she needs to know that a horizontal line chart visualization is a good one to answer the question. Second, she needs to know how to actually build the visualization by mapping fields into the visual variables algebra. She then needs to repeat this process for every new question she wants to answer. In other words, flexible systems based on visual variables impose two significant analyst burdens. Namely, for each new analytic question, the analyst must (1) design a visualization and (2) build the visualization.

These burdens present the most significant hurdles to analysts who are not data visualization experts. As data continues to proliferate, such "casual analysts" are becoming the majority. These analysts have important questions to ask of their data: they want to understand patterns, find outliers, validate hypotheses, and make better-informed decisions. But they are not familiar with visualization theory or best practices, nor do they want to be. Visualization just happens to be the best way to answer many of their questions. Even analysts who are experienced in visualization theory must spend significant time and cognitive effort to design and build, again and again.

Another, perhaps bigger problem is that the space of data visualization is more complicated than sandwiches. The vast range of creative, interactive visualizations that are published each year support this intuition. So a better analogy would be that the space of visualizations spans sandwiches and salads and pizza and sushi. Stores that sell a wide range of food like this tend to group them into stations. Some of the ingredients are shared between stations, but the equipment at each station is different: for example, the pizza station has a pizza oven, while the sushi station has sushi mats and sticky rice.

If you combined all of this equipment into one station, you could make creative things, such as sushi pizza: sushi made in pizza form, using pizza equipment. This new creation could be excellent, or it could be a disaster. What is certain is that it makes things more complicated: now when you want to just make regular sushi, you have to find the sushi equipment and ignore all of the pizza equipment.

Figure 10:
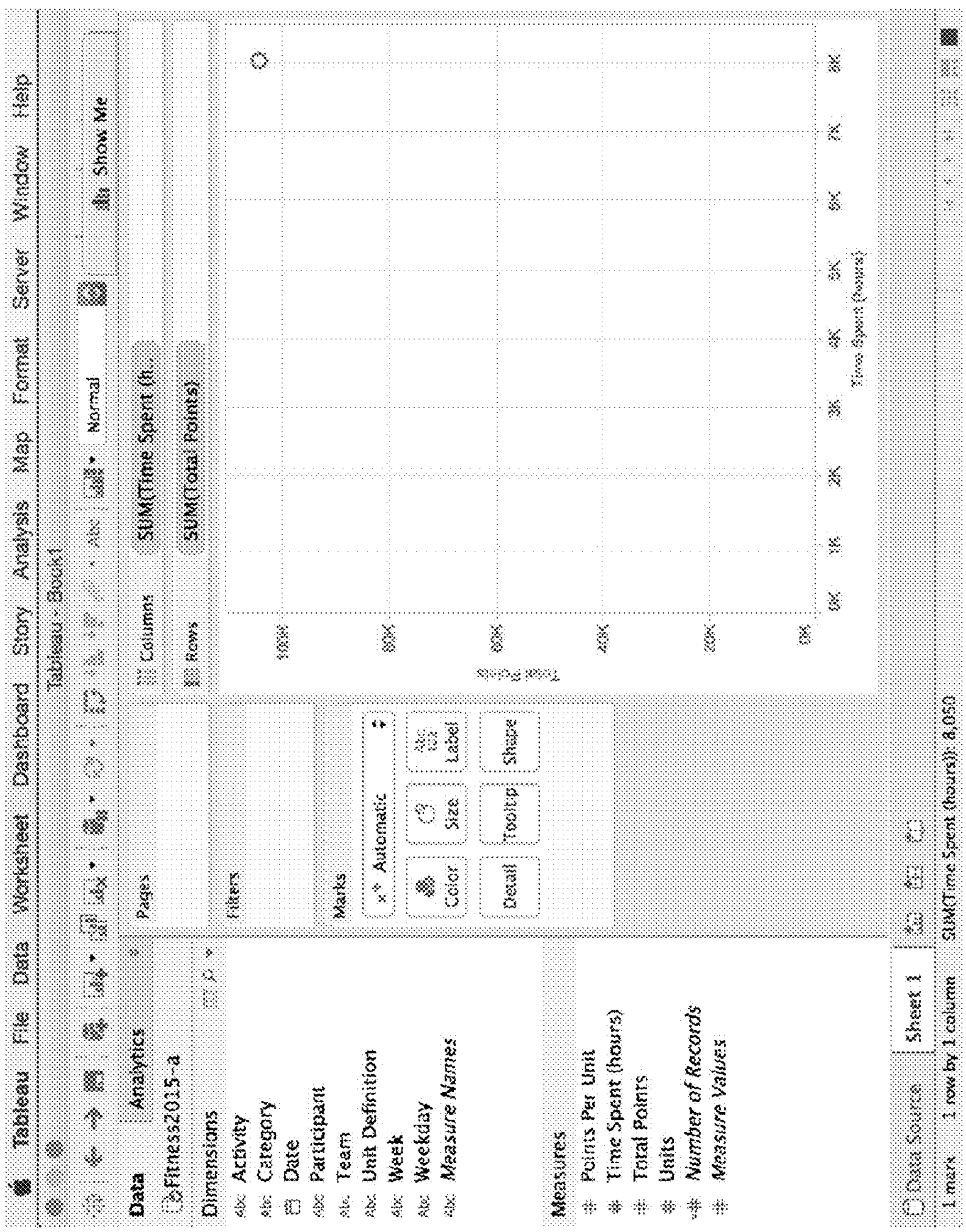
FIG. 10 illustrates a process of building a scatter plot using visual variables, in accordance with some implementations.

One example of "sushi pizza" is a common situation where the analyst wants to build a scatterplot of one variable against another. Dropping the appropriate data fields onto the shelves corresponding to x- and y-positions results in a scatter plot with only one mark—representing the aggregated, total value of each field, as illustrated in FIG. 10.

This is not a useful visualization, and users often struggle to figure out how to get a normal scatter plot with many marks. Part of the difficulty is that there is so much "equipment" scattered around. It's hard to know which tool will solve the problem of converting the single dot into a useful scatterplot. In fact, there are two tools that will accomplish this in different ways; one is named "Detail" and the other "Aggregate Measures". The abstractness of these names is a symptom of the fact that these tools have to be used with all kinds of other visualizations besides scatter plots—like pizza tools that need be recommissioned to make sushi.

Figure 11:
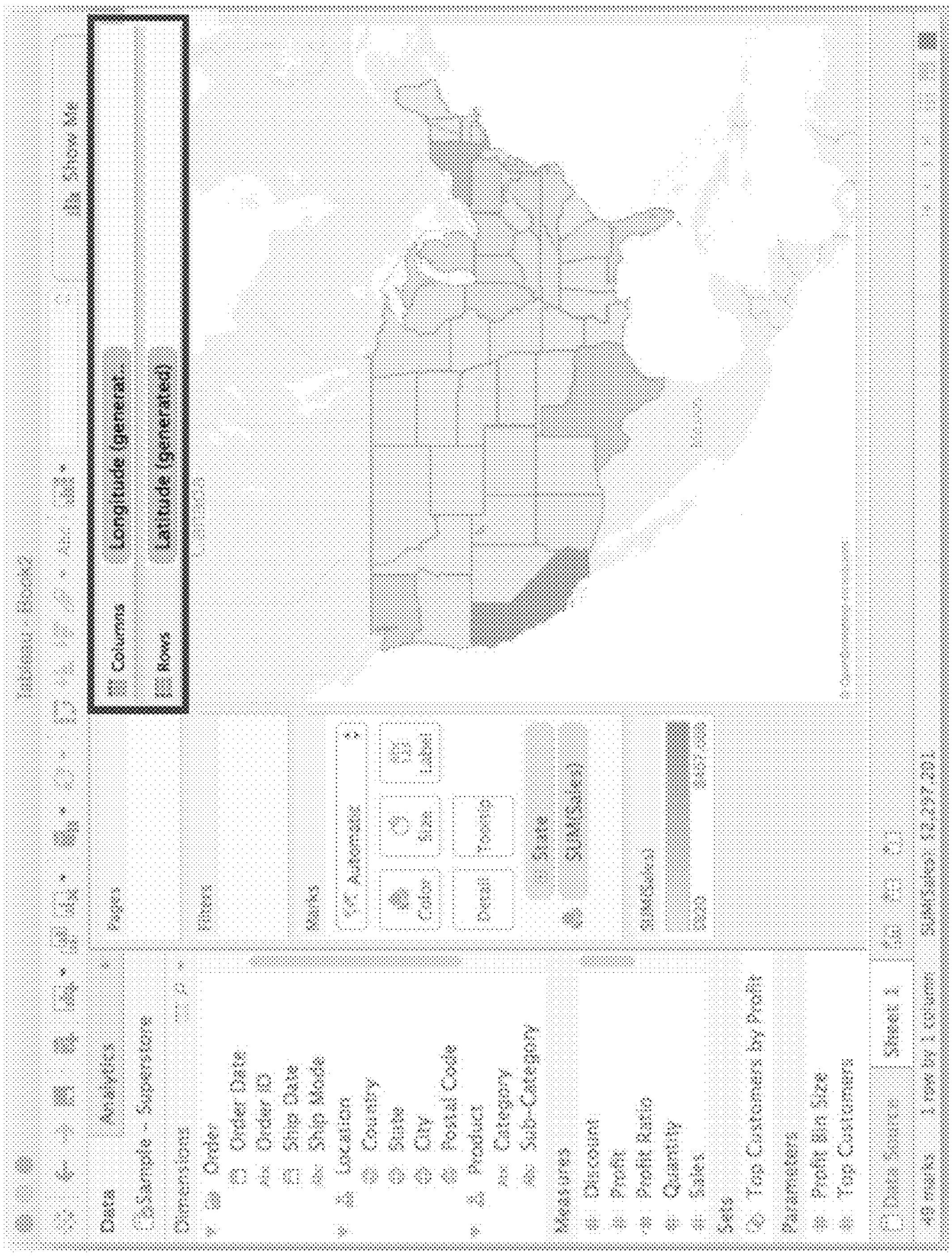
FIG. 11 illustrates a process of building a geographical data visualization using visual variables, in accordance with some implementations.

Another example is the formalism needed to make maps in general-purpose tools. Although there are shortcuts available to create maps (such as the "Show Me" tool in Tableau), map visualizations typically end up with a longitude field on the "Columns" shelf and a latitude field on the "Rows" shelf, as shown in FIG. 11. This is again like trying to use the equipment of pizza to make sushi—here the tools of tabular layout are being used to make a map, which is not a tabular layout.

Data worlds are analogous to splitting the store back into separate food stations for pizza, sushi, sandwiches, and salads. Just as a customer chooses whether she wants pizza or sushi, the data analyst chooses whether she is asking a question about categories or time. The analyst only needs to make that one choice, and she can do it easily by simply tapping on a world icon. But making that one choice provides all sorts of advantages because of the way it greatly reduces the complexity of each individual world.

Figure 12:
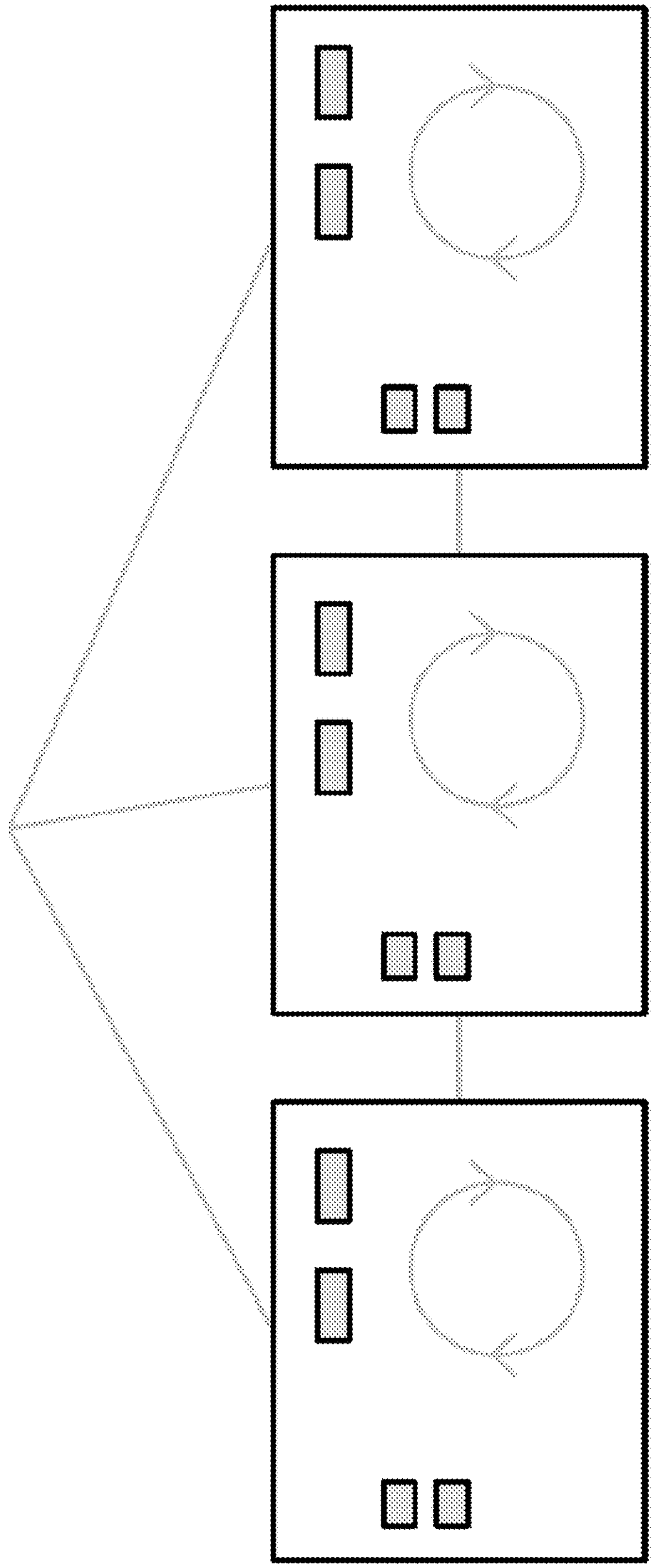
FIG. 12 provides a diagrammatic view of data worlds, in accordance with some implementations.

In the diagrammatic version in FIG. 12, notice also the lines connecting worlds to each other. This represents the importance of being able to easily move between worlds, so that you can combine their power and follow the flow of analytic questions. Splitting the space of data analysis into data worlds provides many advantages.

Figure 13:
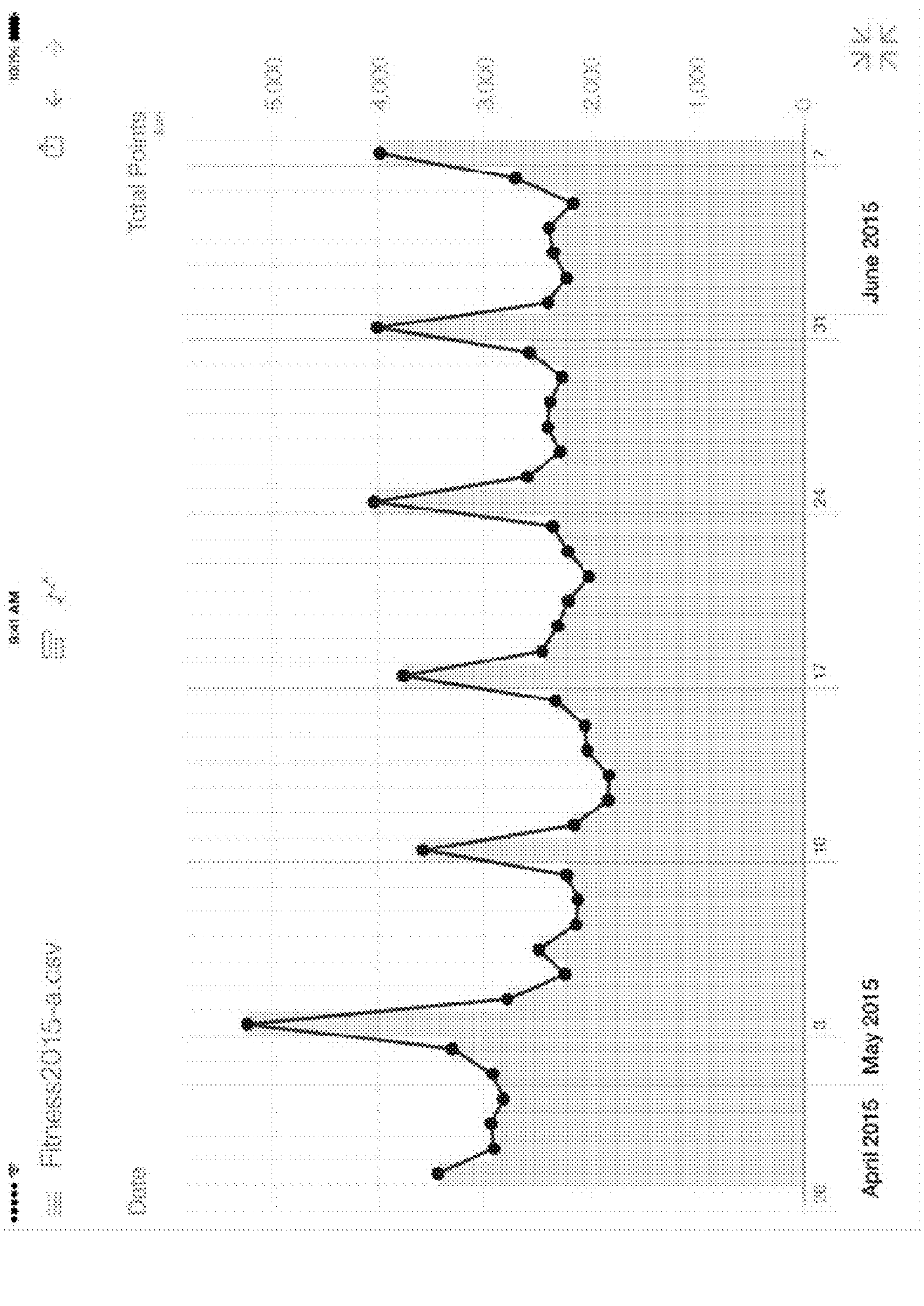
FIG. 13 illustrates the simplicity of creating a line chart in time world, in accordance with some implementations.

One basic advantage is simply the ability to provide good defaults. For example, in Category World, the default is to use categorical fields (usually strings) for the category columns. A user can swipe through these fields, and all of them produce a well-formed chart split into categories. Recall the question that the analyst wanted to answer about the fitness competition: How did the total number of points scored change over time? In disclosed implementations, the analyst merely needs to go to Time World—and she's done. See FIG. 13.

Time World knows that it needs a date/time field, and in many data sets there's only one such field, so it is chosen automatically. In addition, the analyst was previously looking at the "Total Points" metric in Category World, so it is used by default as the metric in Time World as well. This is sometimes called "zero-step data analysis" when the defaults provide what the user needs with no interaction necessary. The simpler the data, the more frequently this situation occurs.

Data visualization environments get better as we make them more interactive, but it's very difficult to design interactions that work well across a range of analytic scenarios and visualization types. In contrast, data worlds are focused enough that we can make each one into a rich, specially tailored interactive space.

Figure 14:
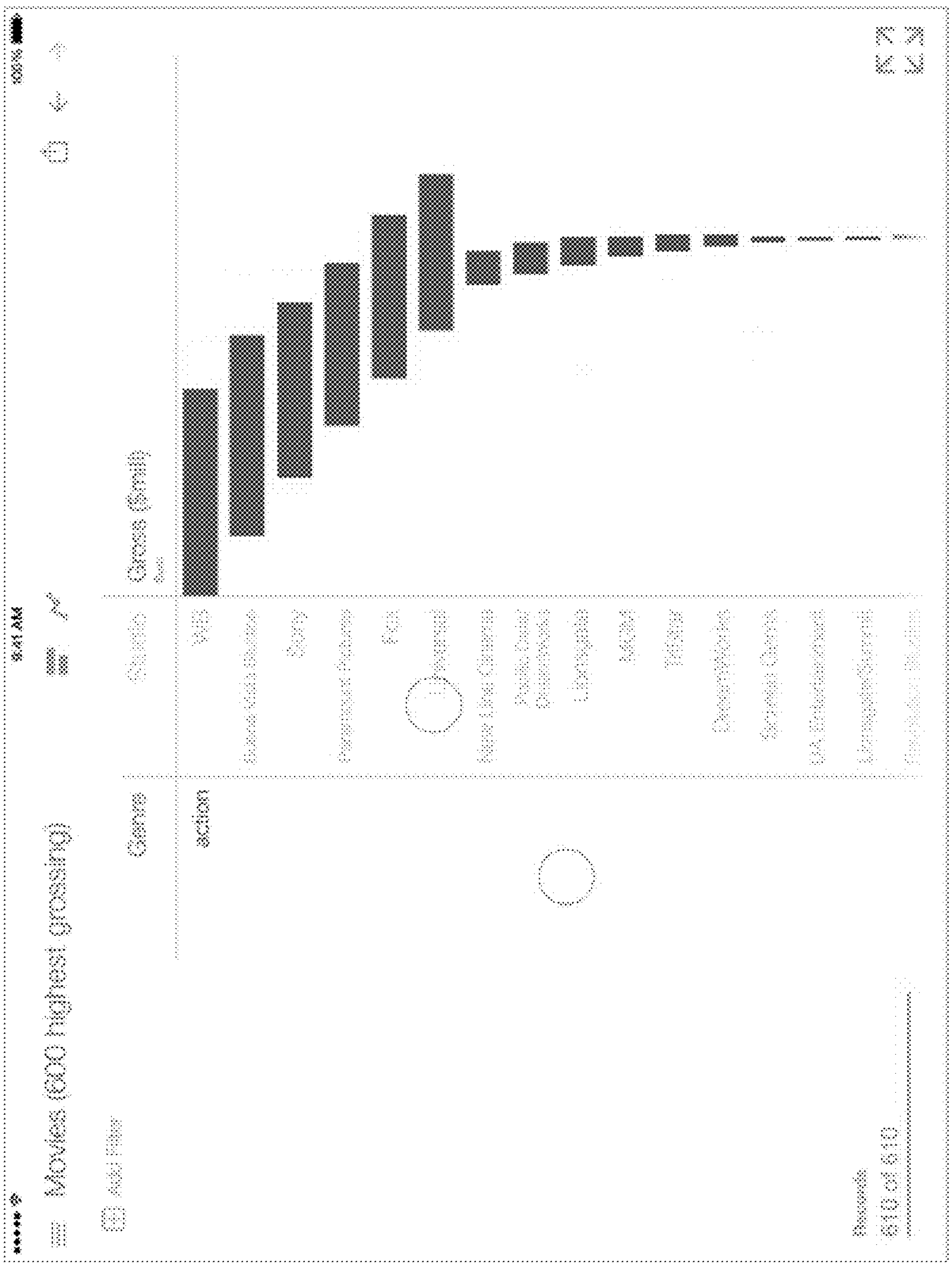
FIG. 14 illustrates an animated transition in category world based on an unpinch gesture, in accordance with some implementations.

Recall how the "pinch to zoom" gesture behaves very differently in the three worlds. In geographical space, it zooms in and out in the normal two-dimensional way expected of a map. In Time World, pinching zooms into the one-dimensional representation of time. And in Category World, pinching zooms into the more abstract space of nested categorical dimensions, with a beautiful animation that splits up the bars accordingly, as illustrated in FIG. 14.

Another example of tailored interactivity is the convenient gesture used for filtering out categories. This is a very common operation in Category World, so it very easy with a swipe left or right to exclude or keep only the category of interest. In other worlds, this operation is less useful, and the gesture does not work well. This poses no problem because each world stands on its own as a tailored interactive space.

Users are generally looking to answer specific questions, not build specific visualizations. In other words, visualizations are shown primarily in service of answering one or more analytic questions. So although each world is designed around a core visual structure, there is no need to limit to any classically defined set of chart types.

Figure 15A:
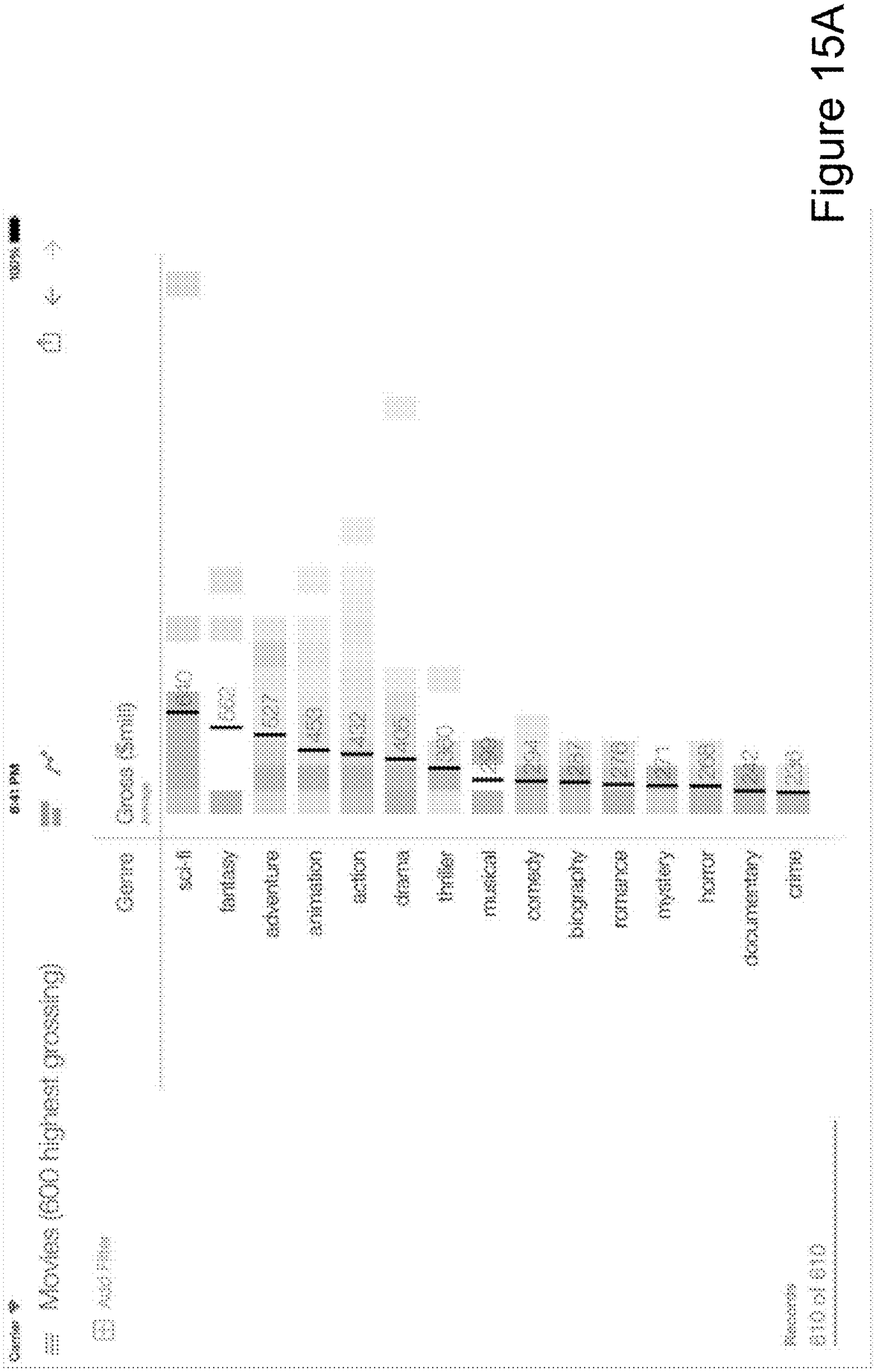
FIGS. 15A-15F illustrate various data visualizations created in category world, in accordance with some implementations.

For example, Category World has the core structure of a bar chart, and in its basic default state, it looks like a classic bar chart. However, if the summary statistic changes from a sum to an average, the distribution of data underlying each average is shown instead, as illustrated in FIG. 15A. This shows how movies were distributed along the axis of how much money they made. These distributions are very important to understand, because they affect whether an average is even a relevant statistic to use. For example, notice that the "sci-fi" category has a far outlier at the right end of the view, which skews the average to the high end. Similarly, the "fantasy" and "adventure" categories have several movies both at the low end of the spectrum and at the high end—but nothing or almost nothing in the middle. In these cases, the "average" value does not represent the typical amount of money that any movie made, again making the statistic potentially misleading. These distributions are heatmap histograms because they show the density of records along a quantitative axis (a histogram) using a color scale from pale gray to blue (a heatmap).

Notice that the overall view retains its basic structure, but it's not really a "bar chart" anymore. This is a good example that analytic usefulness trumps any dogma about classic visualization types.

Figure 15B:
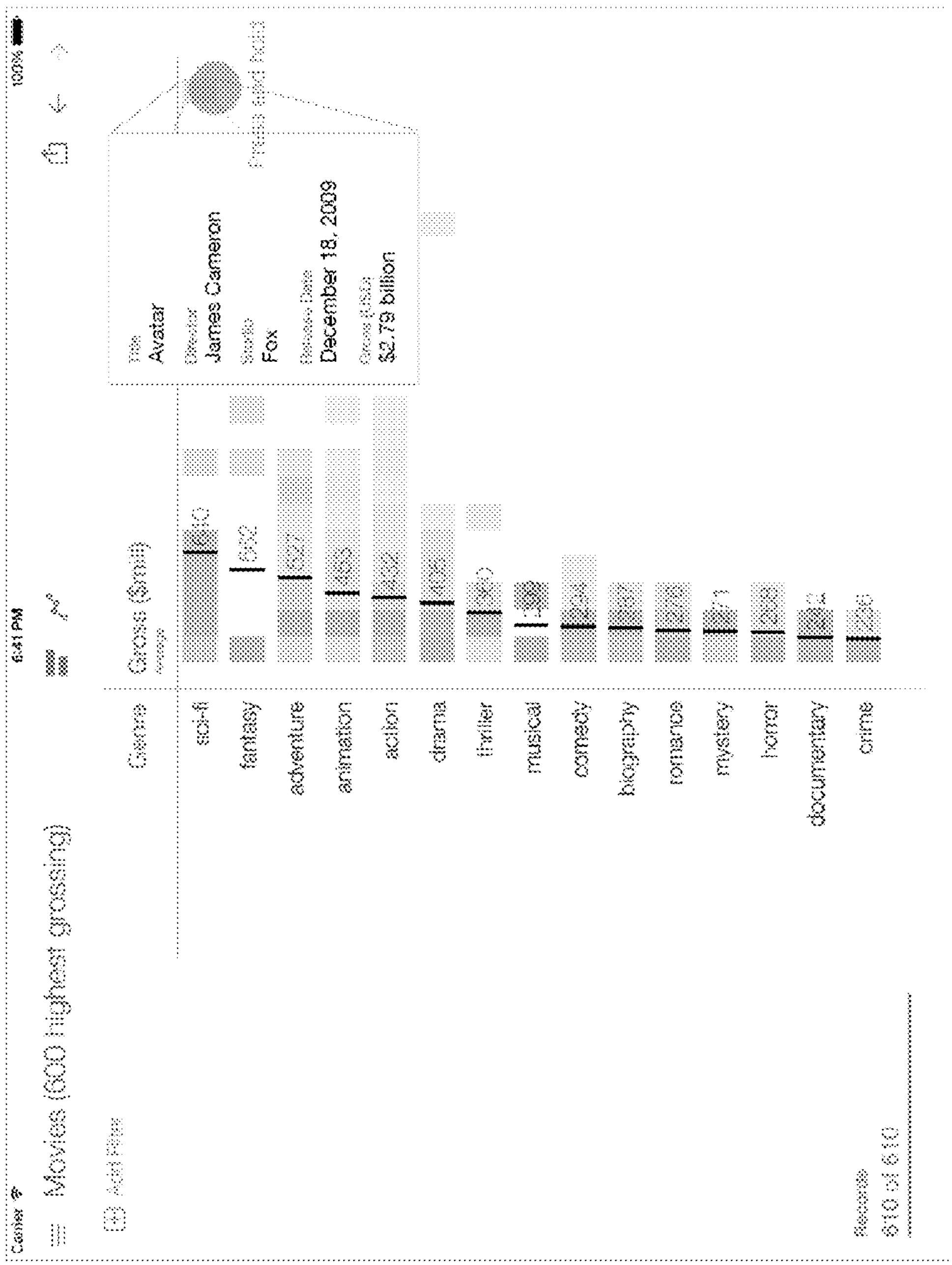

Pressing and holding on the distribution reveals the underlying data, as illustrated in FIG. 15B. In this case, it shows that the outlying movie was Avatar, released in 2009 with gross revenues of $2.79 billion.

Figure 15C:
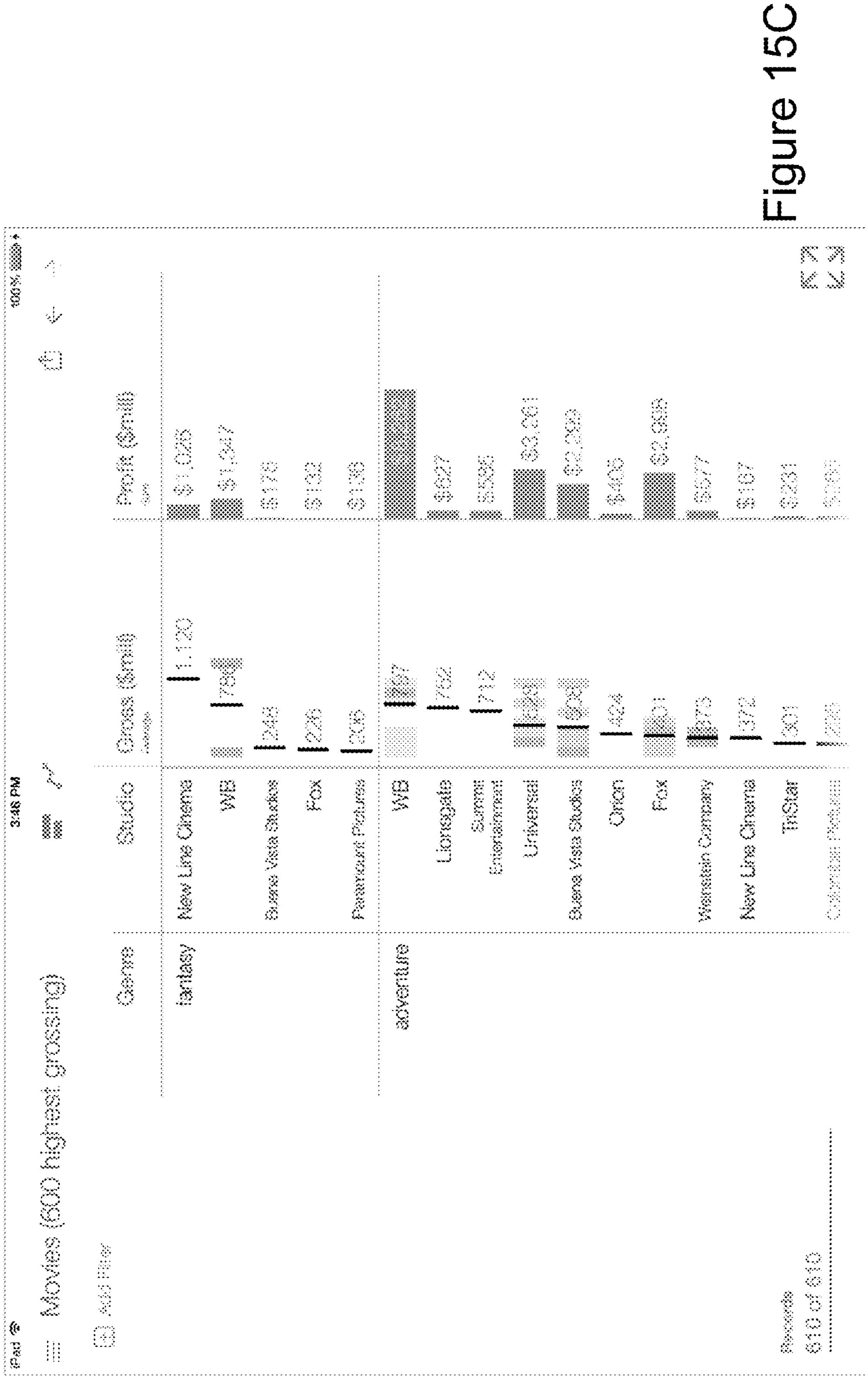
Figure 15D:
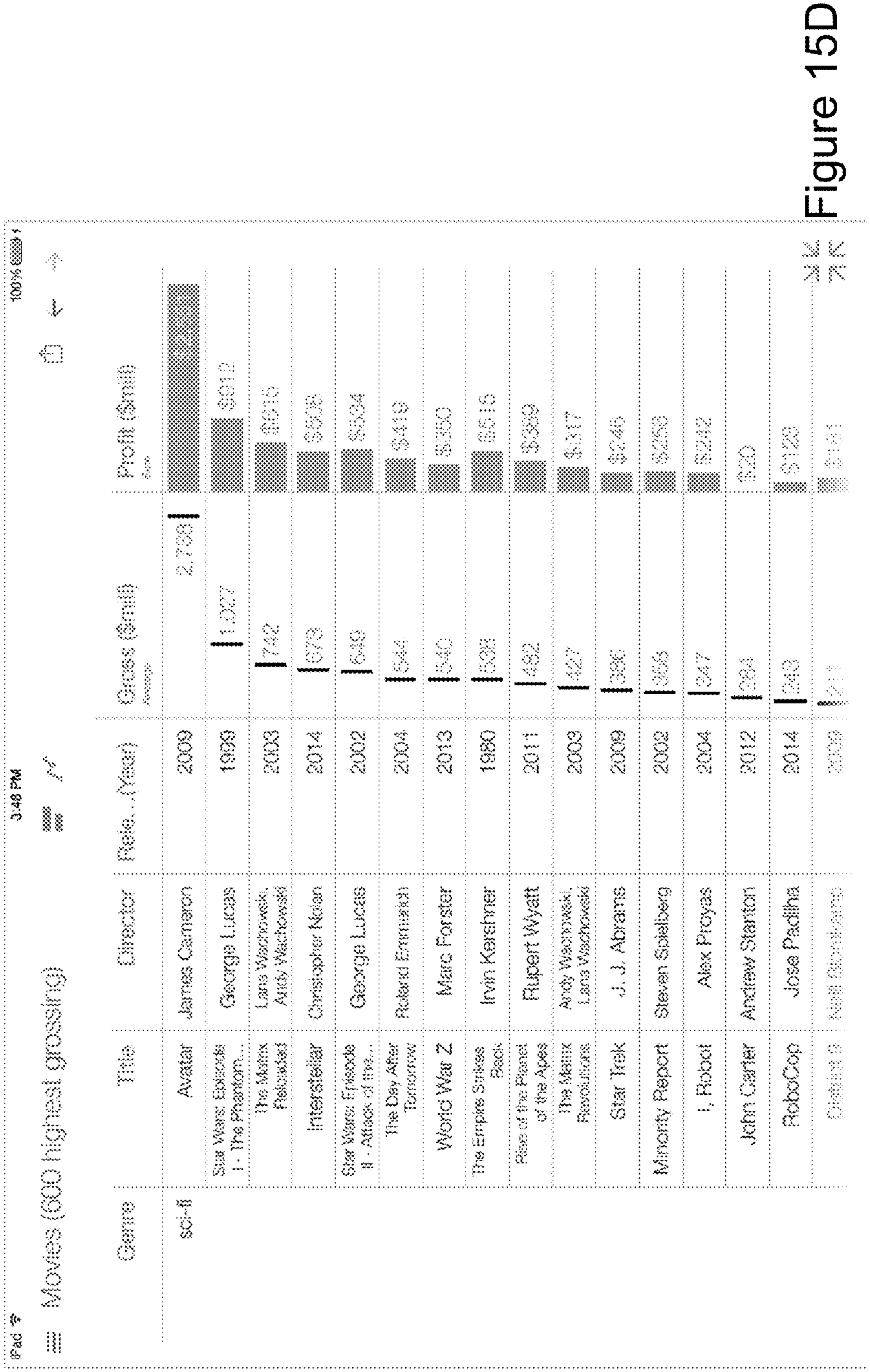

A user can also add extra columns, either to further split up the categories (left side), or to get more information about each category (right side), as illustrated in FIG. 15C. By adding enough columns, a user can analyze all sorts of information about individual movies, as illustrated in FIG. 15D.

Figure 15E:
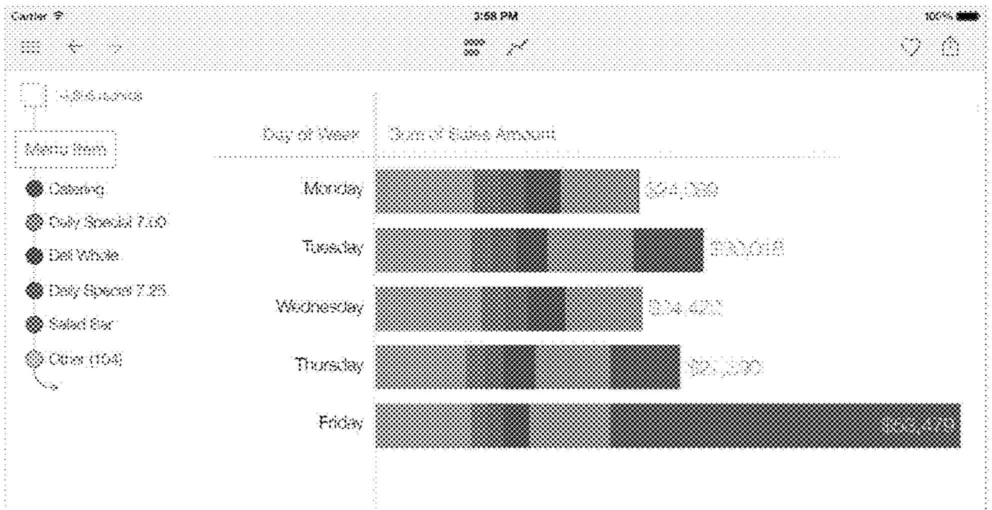
Figure 15F:
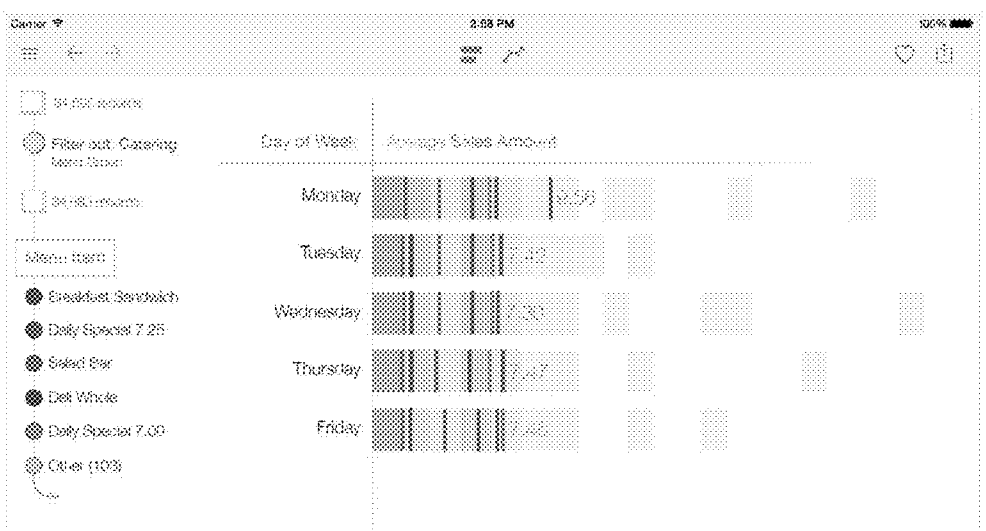

FIG. 15E illustrates that bars can split by color. Splitting by color can also work with averages and overall distributions, as illustrated in FIG. 15F.

Figure 16A:
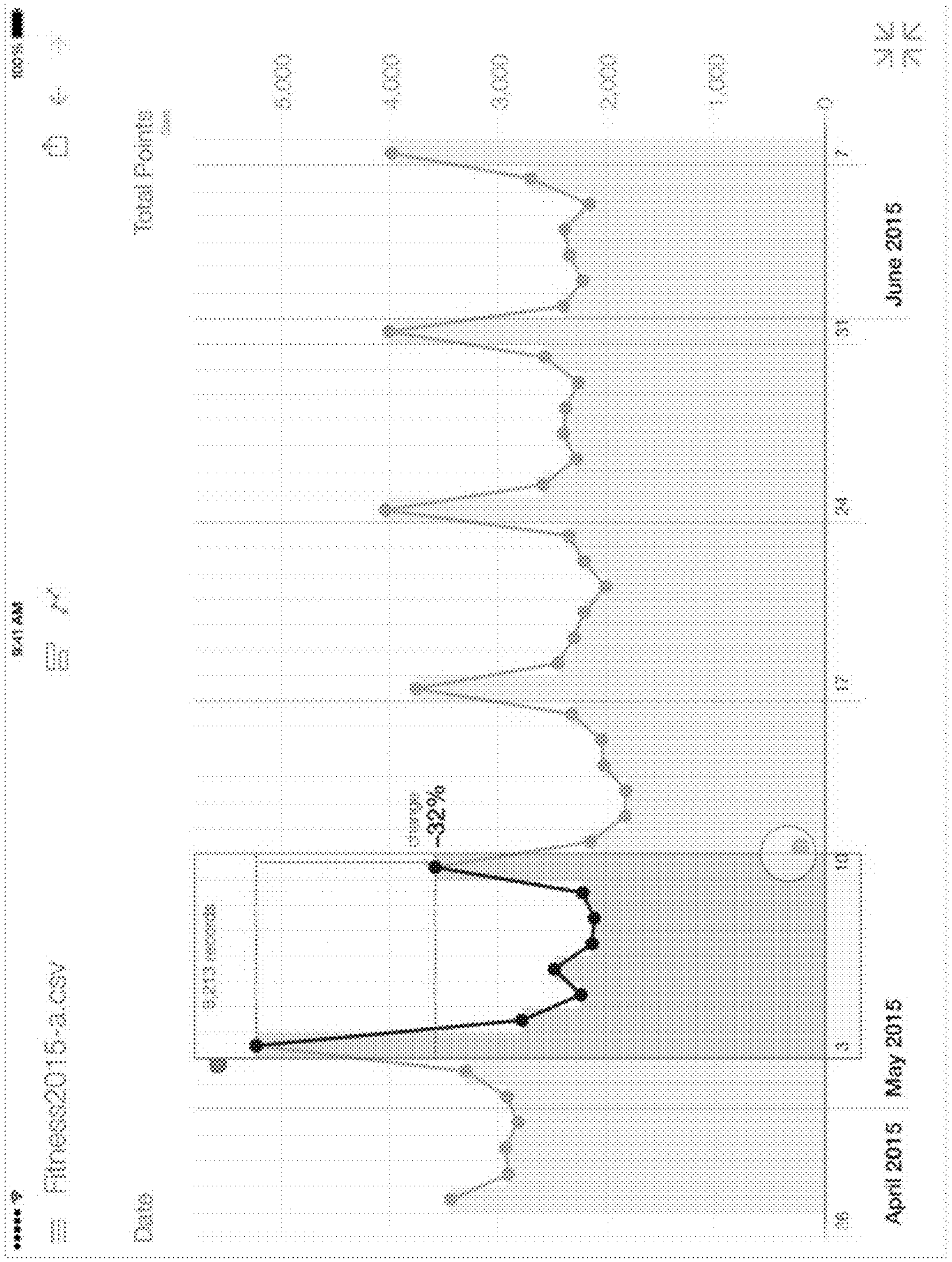
FIGS. 16A and 16B illustrate various data visualization created in time world, in accordance with some implementations.

Time World has a similar depth of analytic potential. For example, it lends itself easily to calculations common to temporal analysis, such as the percent change of an indicator over time. In FIG. 16A, by simply dragging out a selection box, the analyst has found that 32% fewer points were scored in the second weekend of the fitness competition than in the first.

Figure 16B:
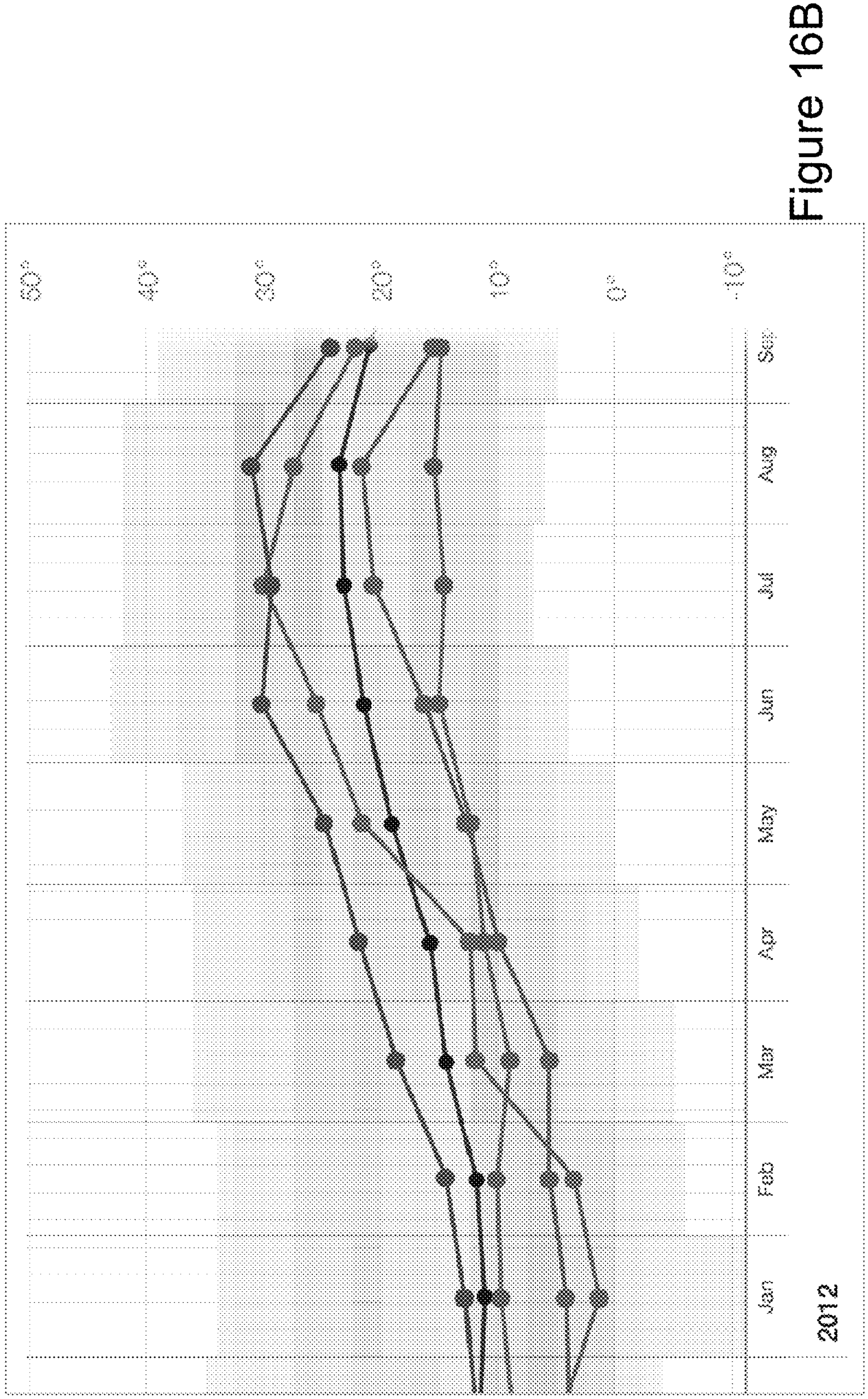

And as in Category World, Time World can access heatmap histogram distributions, underlying data, and can be split by color, as illustrated in FIG. 16B.

Notice that new, separate worlds are not needed for "stacked bar chart" or "multi-line time series." Instead, the basic structure of a timeline supports a very large cluster of temporal analytic questions. This analytic depth is a fundamental property of all data worlds, in part because it keeps the total number of worlds very small. Without this, data worlds would devolve into yet another long list of chart types.

A user's flow of analysis inevitably leads to new, related questions, and so on. Each data world is rich enough that many related questions can be answered within it. For example, a view of average movie revenues could lead to new questions (and answers) related to profits, studios, and individual movie details, all without leaving Category World.

Figure 17A:
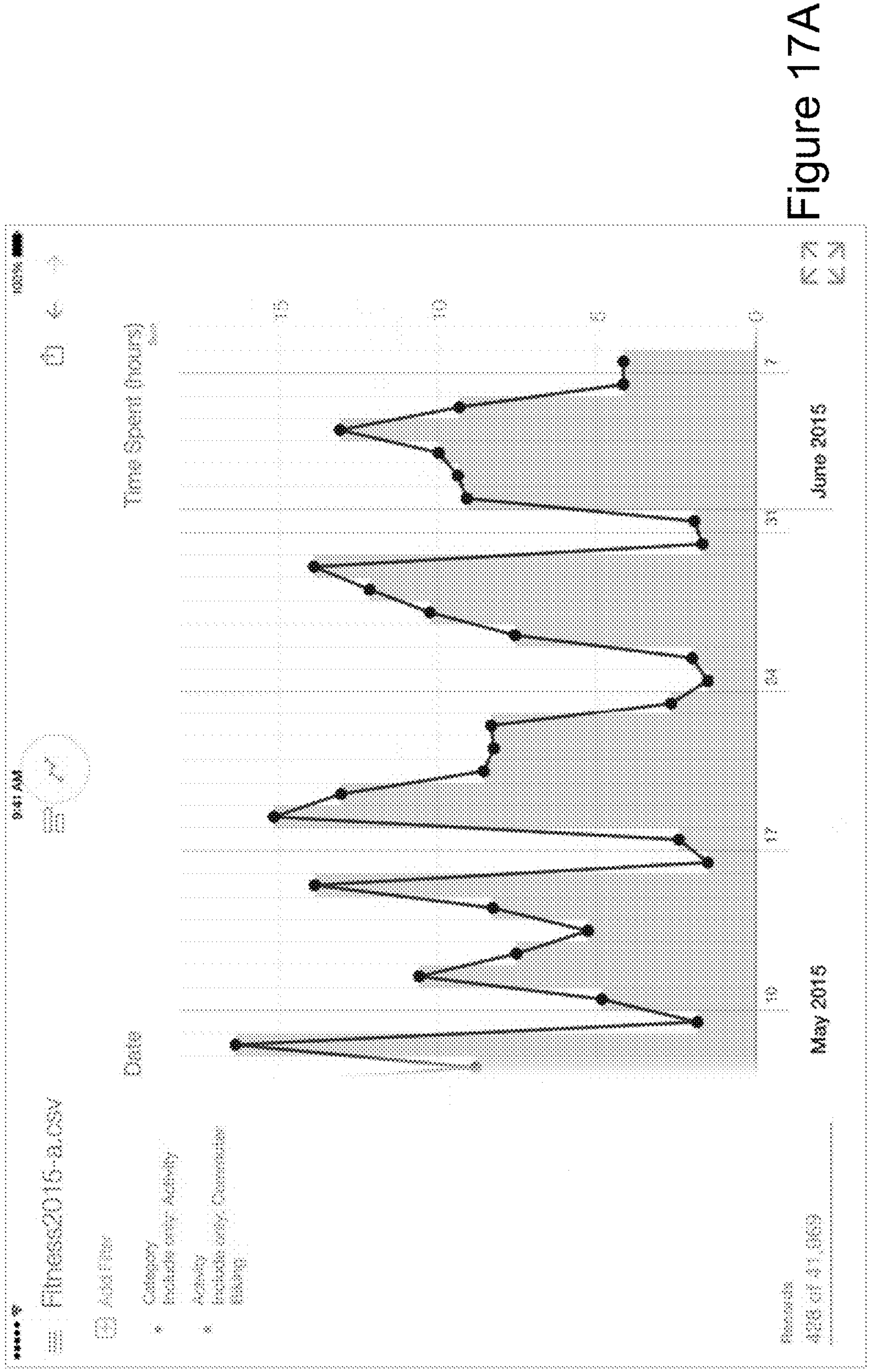
FIGS. 17A and 17B illustrate switching from one data world (interaction profile) to another data world, in accordance with some implementations.
Figure 17B:
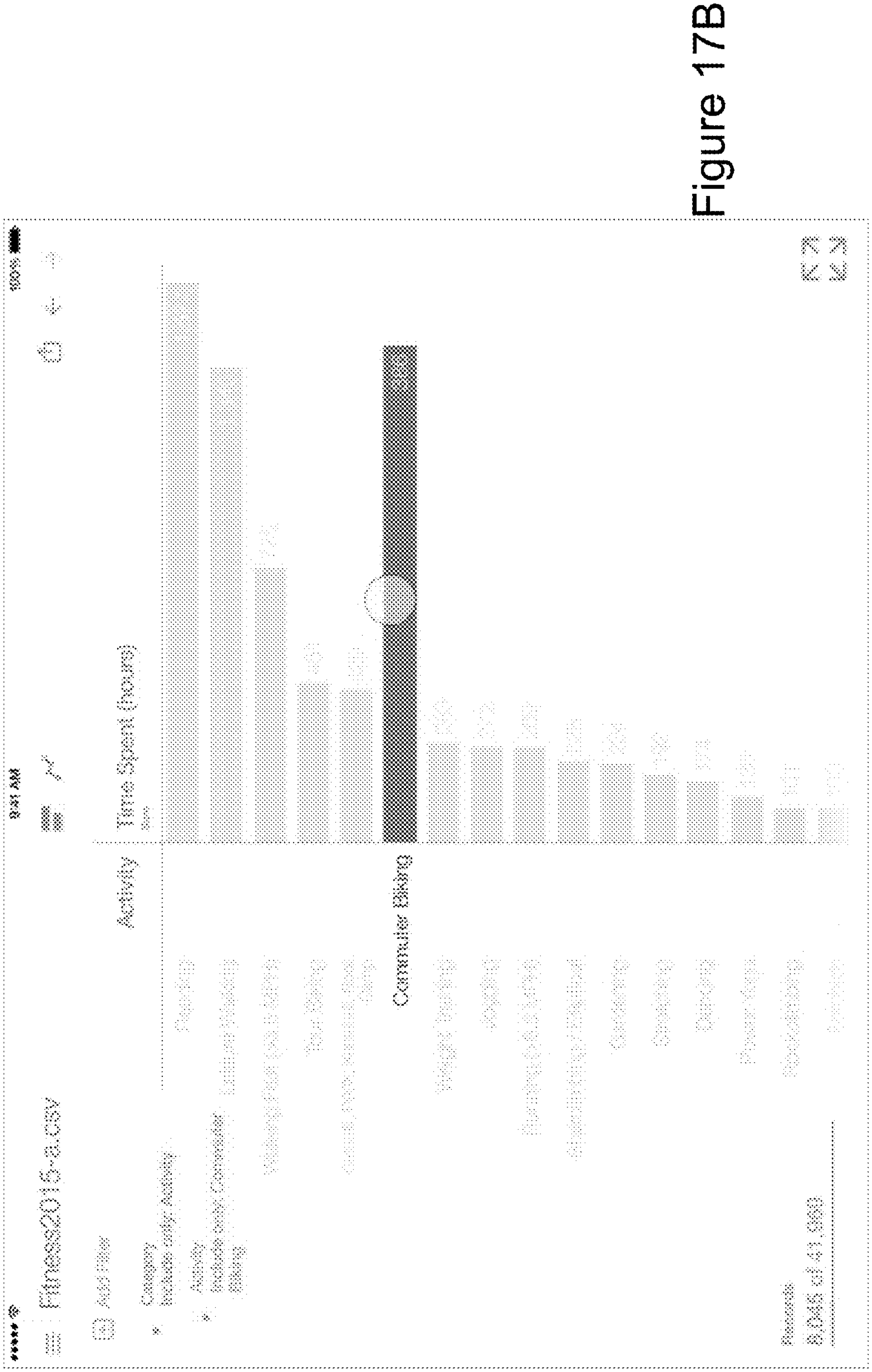

But many related questions are best answered in different worlds, so the ability to easily move between worlds is also critical. As an example, suppose the analyst is looking at the amount of time that participants spent in the fitness challenge doing each type of activity. (It turns out that participants logged the most number of hours Reading, and the second most Leisure Walking.) The analyst is curious to see how Commuter Biking played out over time. In Category World, she drags the Commuter Biking row to the right to filter out everything else, and then taps on Time World, which immediately shows how Commuter Biking hours trended over time. (Not surprisingly, commuter biking dropped off during weekends.) This is illustrated in FIG. 17A (using time world) and FIG. 17B (using category world).

As illustrated in this example, two major properties of data worlds facilitate moving between worlds. First, the world switcher buttons are a top-level affordance, available at any time with one tap. Second, all analytic components that have corresponding components in other worlds are shared between worlds. In the example, both Category World and Time World include the notion of filters and numeric summaries. Therefore, any filters and numeric summaries set in one of the worlds transfers directly to the other. (In the example, the Commuter Biking filter and the Time Spent metric were both honored in Time World.) If some future world does not include the notion of a numeric summary, that's fine—the world will simply ignore that component. And when the user returns to Time World or Category World, the numeric summary will still be there, unchanged.

A primary function of statistics in data analysis is to help separate the signal from the noise. In the words of one statistician, "Statistics is about protecting analysts from false conclusions based on data containing random error." No analyst wants to make false conclusions based on random noise. But in order to check that any given result is robust, an analyst using existing general-purpose statistics tools faces yet more burdens. Namely, she must know (1) which statistical test(s) are relevant, and (2) how to run those tests using the given statistics package. Then she must repeat this for every new analytic result.

This process of determining and running each statistical test mirrors the cycle shown earlier of designing and building a new visualization for every new analytic question. Disclosed implementations also make it easy to see the statistics.

Statisticians have developed a dizzying array of statistical techniques and indicators, but each method has a fairly narrow scope of applicability. For example, a chi-squared test can compare two or more sets of count data and tell you the likelihood that any difference between counts is the result of random chance. Data worlds provide an ideal way to narrow this huge space to only the test(s) that are relevant in a given situation—not unlike the opportunities discussed for choosing relevant data fields, visualization techniques, and rich interactions.

Figure 18A:
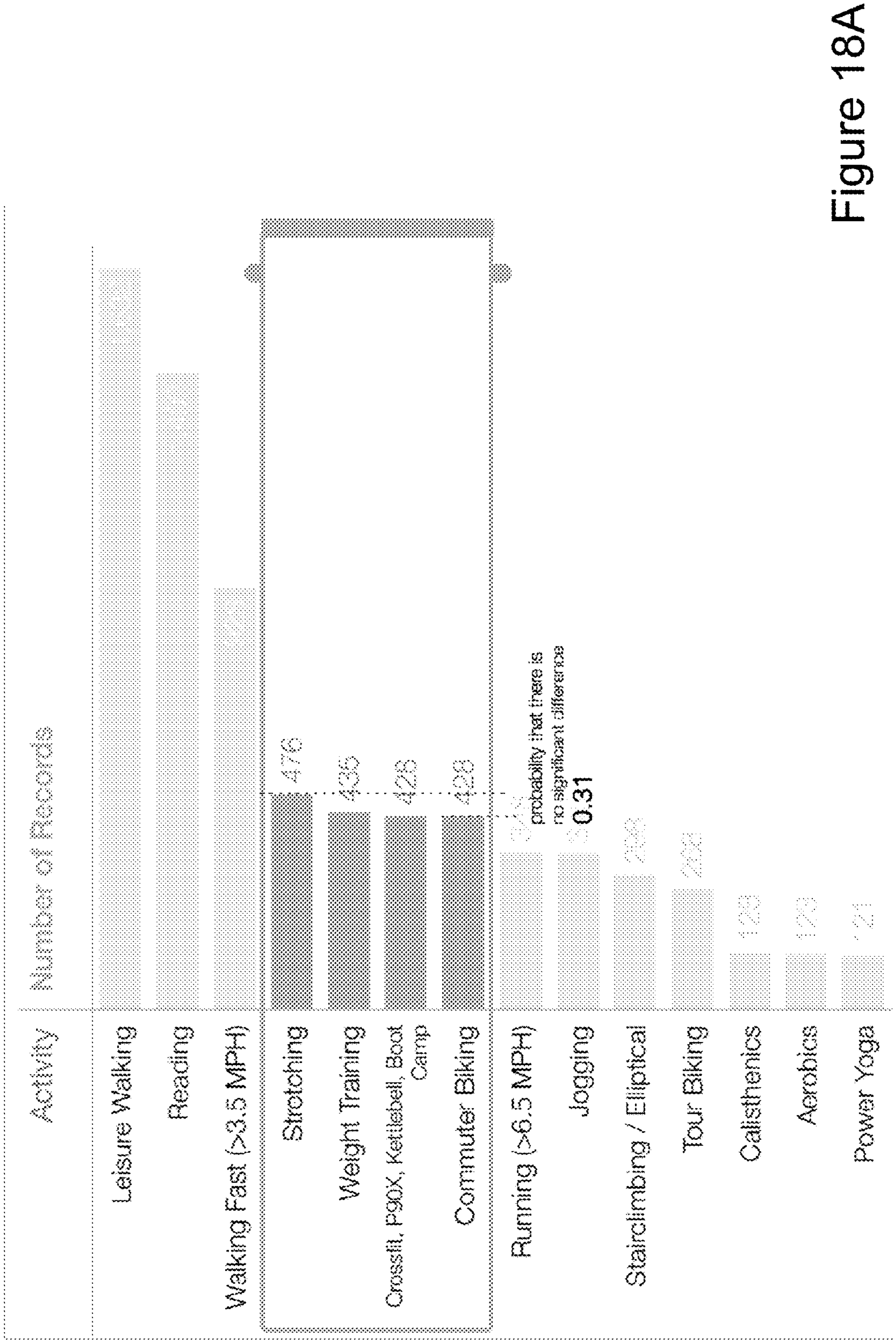
FIGS. 18A-18C illustrate statistical data that is provided automatically based on the selected interaction profile and selected visualization characteristics, in accordance with some implementations.

For example, suppose the analyst is looking at the number of times that each fitness activity was performed, and selects four activities of interest. Because she is using Number of Records, the summaries are counts. And because she has selected these activities in Category World, she is probably interested in comparing them. That's enough information for the application to know that a chi-squared test is the appropriate one to check the statistical validity of the comparison. The application displays the result by default, so the analyst sees immediately that there is a 31% chance that any differences displayed between these activities are due to random noise. There is no requirement that the user be a statistics expert, and no need for her to even request the validity check! This is illustrated in FIG. 18A.

Figure 18B:
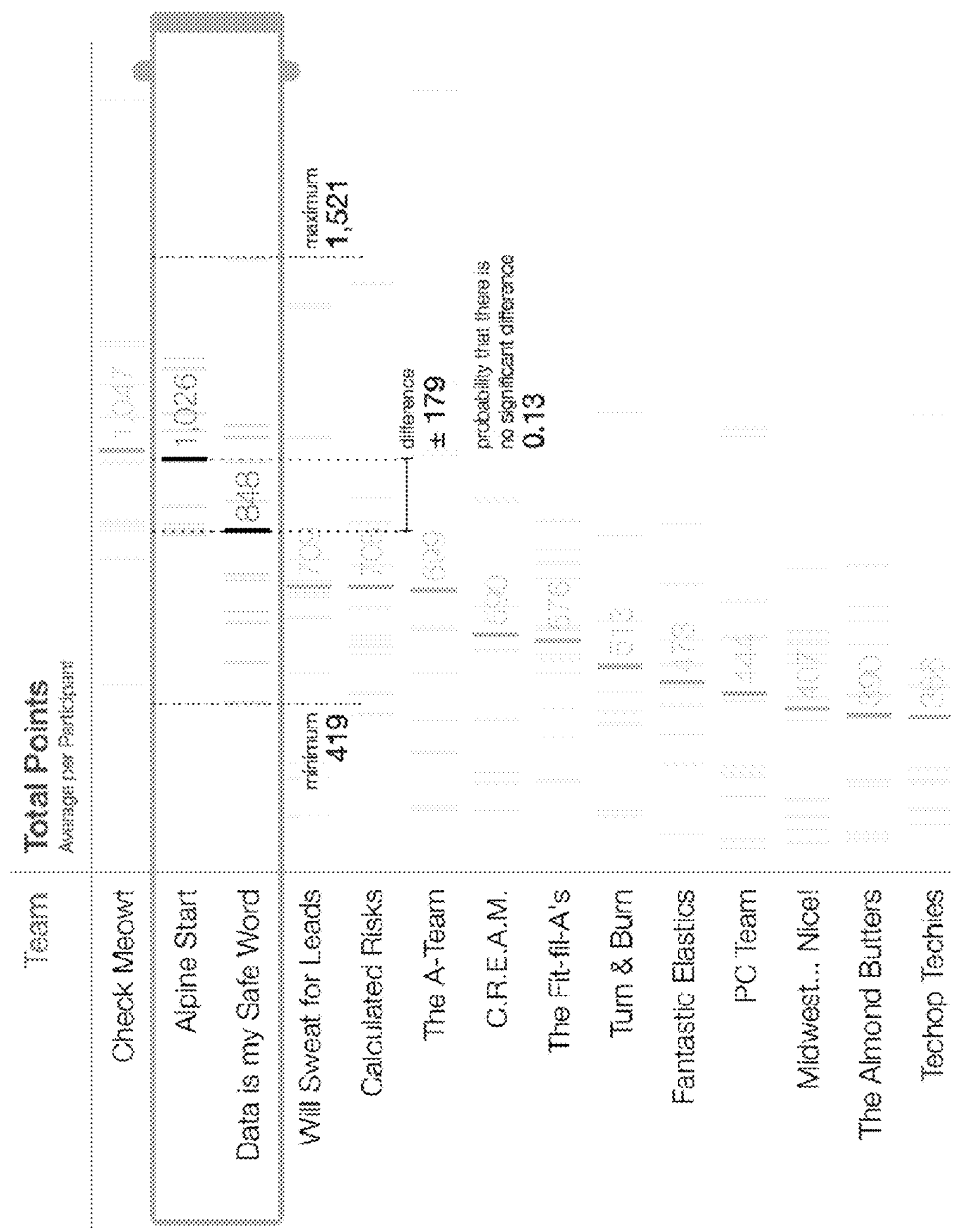
Figure 18C:
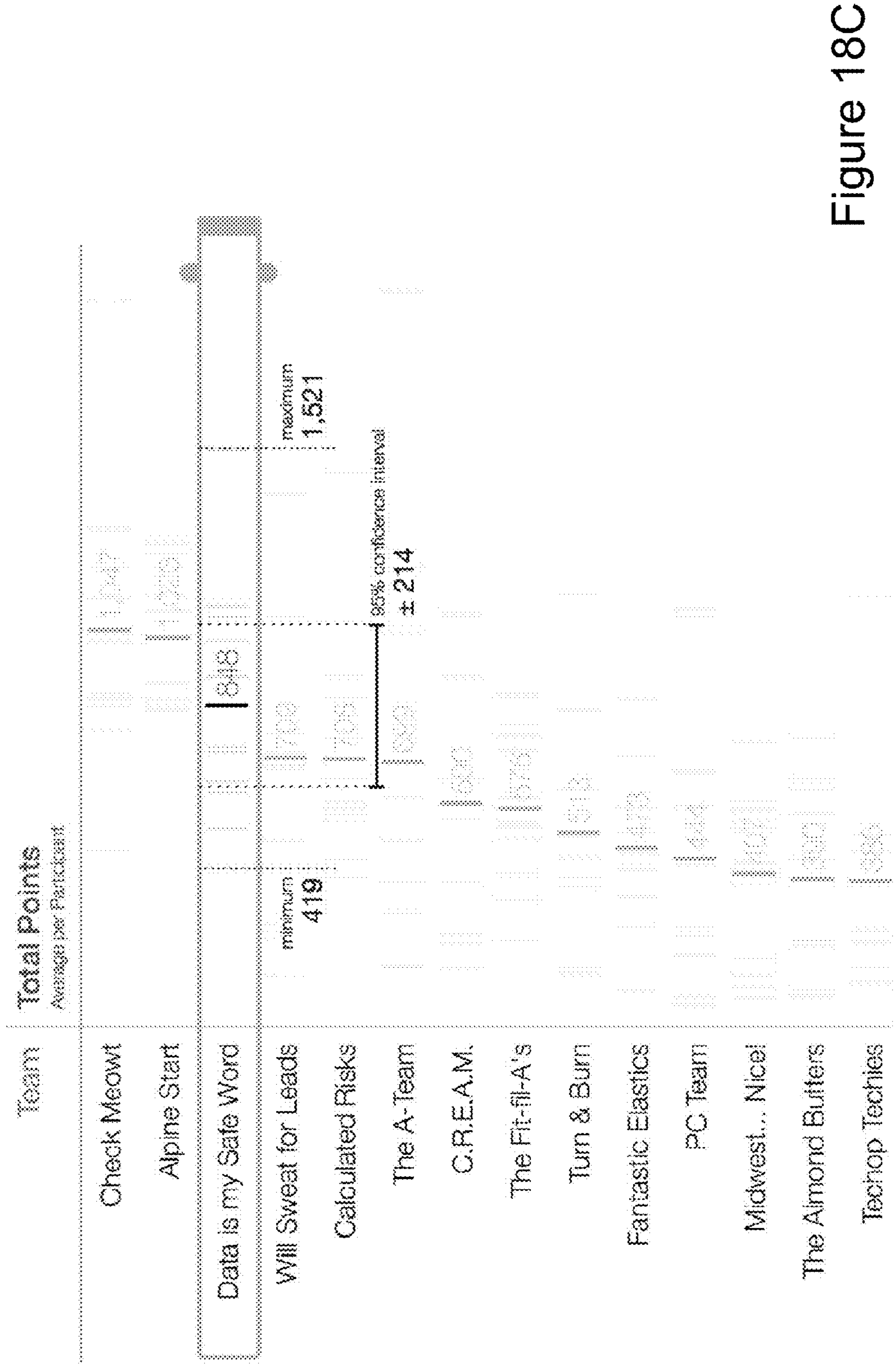

When comparing average (mean) values, the appropriate statistical method is a t-test. But the analyst doesn't have to know that. She simply selects categories of interest, just as before, and the software will show by default the probability that there is no significant difference, as shown in FIG. 18B. Some implementations show other statistical indicators such as confidence intervals in a similar way, as illustrated in FIG. 18C.

Figure 19A:
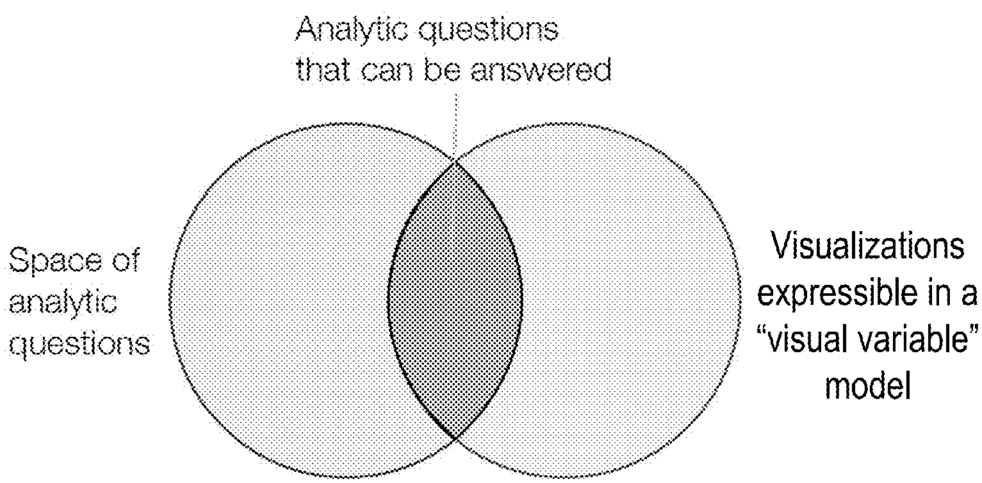
FIGS. 19A and 19B provide diagrams comparing analytic questions that can be asked versus data visualizations that can be created using data visualization applications, in accordance with some implementations.

Consider the full space of analytic questions, represented by the left circle in FIG. 19A. This is a very large space that includes all possible questions one could ask of all types of data. It includes everything the analyst has asked in the running examples, and so much more. Which participants scored fewer points than some cutoff? How many activities are there? Which activities would have the most impact on standings if removed from the competition? The list is practically endless.

The right circle represents all visualizations that can be expressed using the "build your own sandwich" visual variables model. The area of overlap represents all analytic questions that can be answered using those available visualizations. Because visual variables are so visually expressive, one can create many different possible charts that each answer the same analytic question. That's why even this very expressive model still only covers a small portion of the analytic space.

Figure 19B:
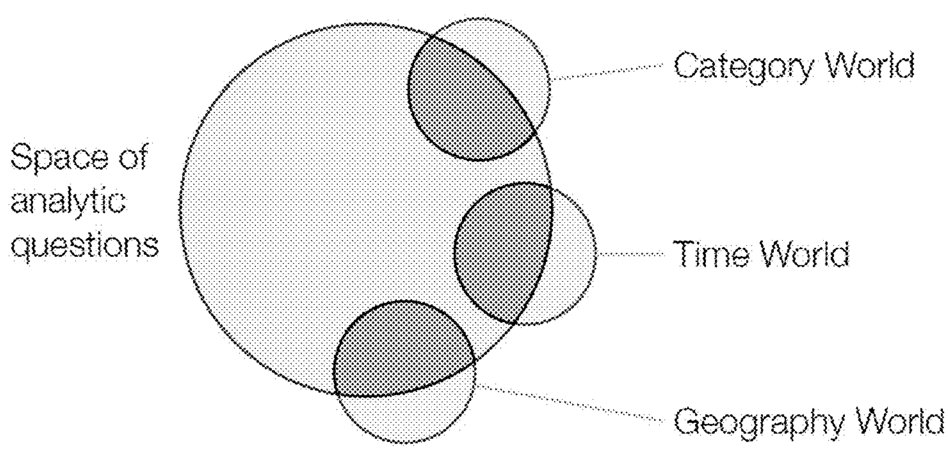

In contrast, each data world focuses on a smaller set of questions, but each one more efficiently covers a significant portion of the analytic space, as illustrated in FIG. 19B.

Note that these models are not limited to mobile devices. They apply equally well to desktop computers.

Figure 20:
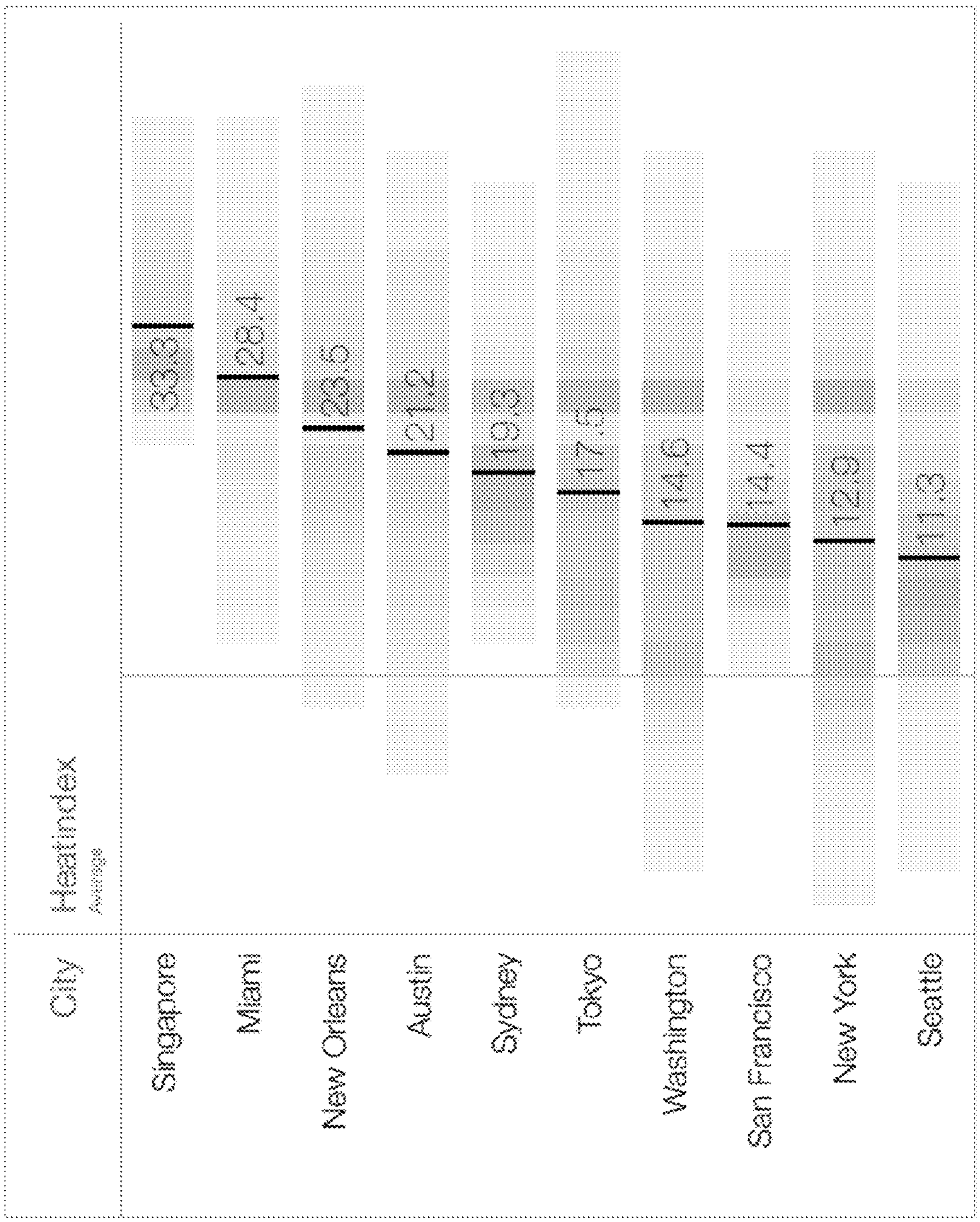
FIG. 20 illustrates displaying a heatmap histogram in category world, in accordance with some implementations.

In general, simplicity is often difficult to achieve. In other words, there is often a lot of complexity that supports the end user's experience of simplicity. In the case of data worlds, the complexity behind the simplicity is a hierarchical model of related analytic questions, and the visualization techniques that best answer each of those questions. Each branch of this tree encodes a piece of knowledge that's contained in the model, such as: If the analyst is in Category World, and there is one dimension and one measure in play, and the measure uses a distributional statistic (such as Average), and the analyst is interested in raw values, then the current view shows a single column of heatmap histograms, as illustrated in FIG. 20.

In addition to categorical, temporal, and spatial analysis, there are other compelling data worlds, such as Correlation World, whose basic structure is a scatter plot, and a Relationship World whose basic structure is a network diagram. There are also worlds that are well suited for task families such as text processing, data cleaning, and row-level inspection.

Figure 21A:
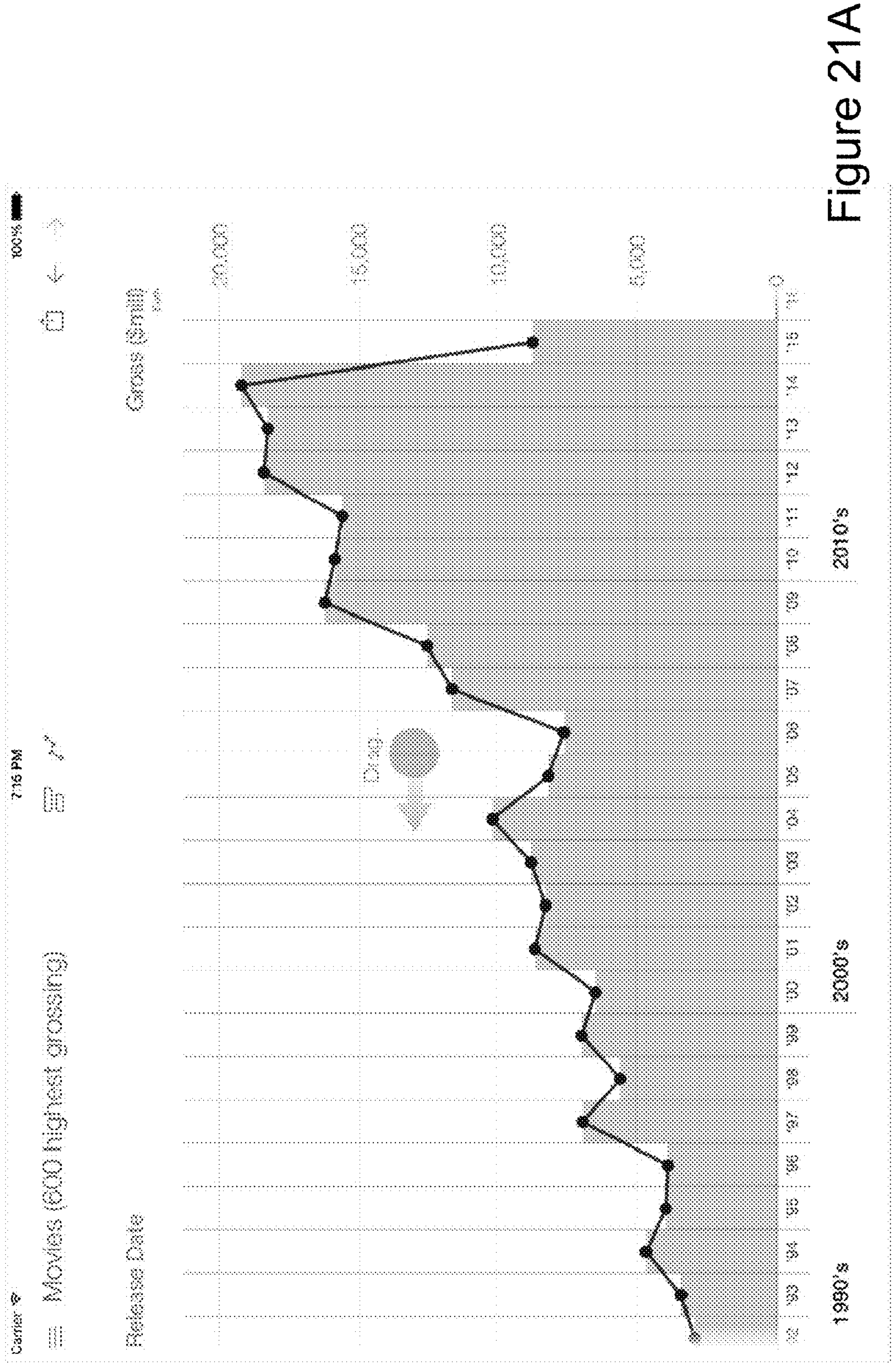
FIGS. 21A and 21B illustrate computing a temporal forecast in time world based on a single gesture, in accordance with some implementations.
Figure 21B:
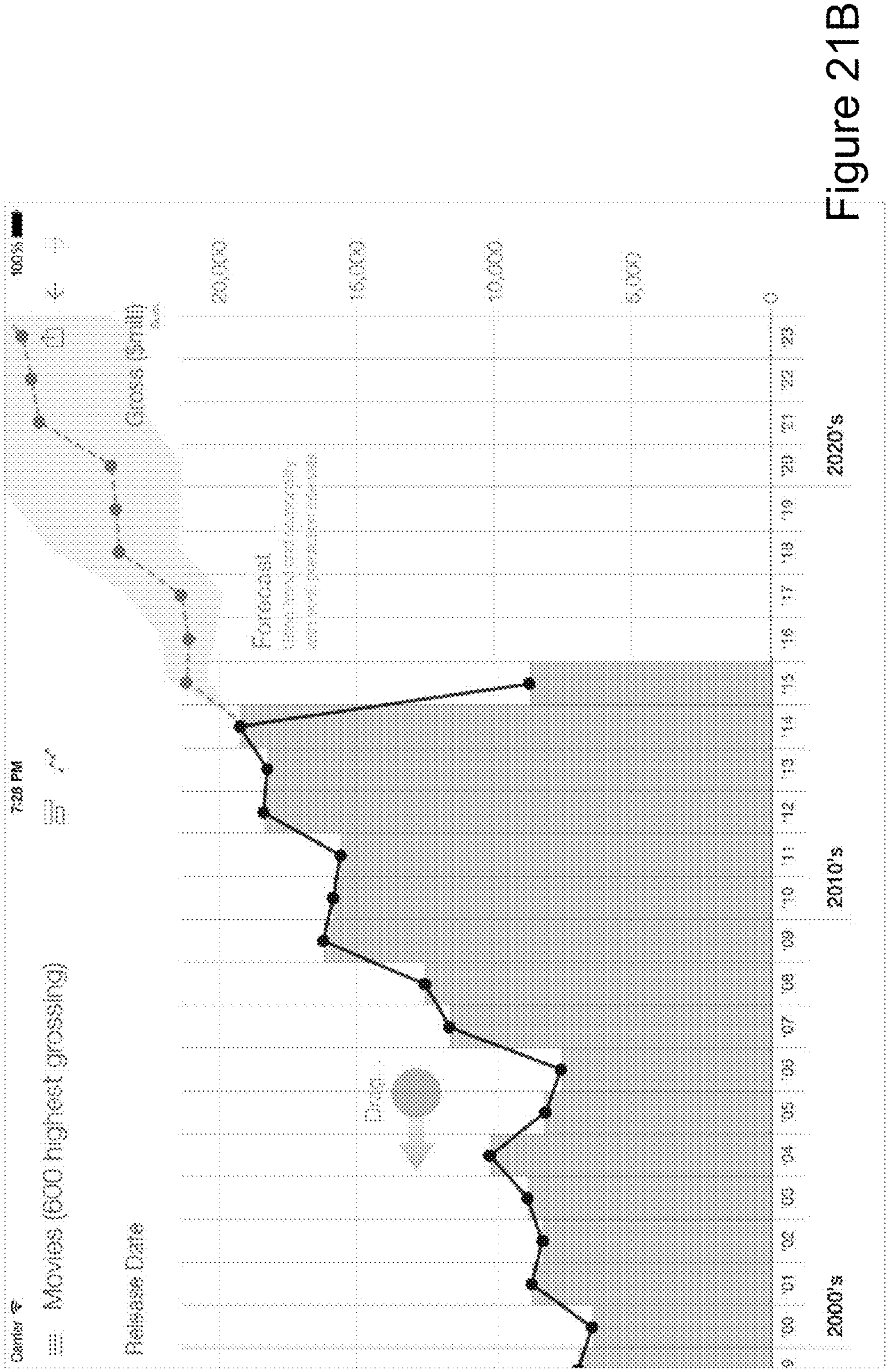

Data worlds also enable a forecasting feature to help analysts predict what might happen in the future if trends in the data continue to hold. In time world, some implementations build a forecast when a user drags to the left, as illustrated in FIGS. 21A and 21B.

Without the underlying model of data worlds, neither the interaction (drag to the left) nor the statistic (forecasting) would make much sense. The fact that a user is in Time World is what enables this beautiful simplicity, and the ease of use that comes when rich, relevant functionality appears by default.

It will be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, without changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific implementations. However, the illustrative discussions above are not intended to be exhaustive or to limit the claims to the precise forms disclosed. Many modifications and variations are possible in view of the above teachings. The implementations were chosen and described in order to best explain principles of operation and practical applications, to thereby enable others skilled in the art.

What is claimed is:

1. A method of analyzing data, comprising:

at a computing device having one or more processors and memory storing one or more programs configured for execution by the one or more processors:

receiving user selection of a dataset and user selection of a first interaction profile of a plurality of interaction profiles, wherein each interaction profile specifies (i) a corresponding user interface and (ii) a corresponding decision tree for forming data visualizations according to selected fields from the data set and according to user-selected analytic questions;

without further user interaction:

selecting a first plurality of fields in the dataset according to the first interaction profile; and displaying a first data visualization user interface corresponding to the first interaction profile;

in accordance with (i) the decision tree corresponding to the first interaction profile, (ii) the first plurality of fields, and (iii) a user-selected analytic question, displaying a first data visualization in the first data visualization user interface, wherein the first data visualization includes visual marks based on the first plurality of fields in the dataset;

receiving user specification of one or more data visualization characteristics in the first data visualization user interface, and updating the first data visualization according to the specified one or more data visualization characteristics;

receiving user selection of a second interaction profile distinct from the first interaction profile; and in response to the user selection of the second interaction profile:

displaying a second data visualization user interface corresponding to the second interaction profile; and displaying a second data visualization using at least a subset of the first plurality of fields in the dataset, wherein the second data visualization is displayed in accordance with the decision tree corresponding to the second interaction profile and the specified one or more data visualization characteristics.

2. The method of claim 1, wherein the specified one or more data visualization characteristics include color encoding of the visual marks.

3. The method of claim 1, wherein the specified one or more data visualization characteristics include size encoding of the visual marks.

4. The method of claim 1, wherein the specified one or more data visualization characteristics include specifying which aggregation function is used for summarizing data values for fields that are aggregated.

5. The method of claim 4, wherein the specified aggregation function is selected from the group consisting of SUM, AVERAGE, MIN, MAX, MEDIAN, and QUANTILE.

6. The method of claim 1, wherein the first interaction profile specifies category analytics, and the second interaction profile specifies time analytics.

7. The method of claim 1, further comprising in response to the user selection of the second interaction profile:

automatically selecting one or more additional fields from the dataset, wherein the one or more additional fields are not in the first plurality of fields;

wherein displaying the second data visualization uses the one or more additional fields.

8. A computer system, comprising:

one or more processors;

memory; and one or more programs stored in the memory and configured for execution by the one or more processors, the one or more programs comprising instructions for:

receiving user selection of a dataset and user selection of a first interaction profile of a plurality of interaction profiles, wherein each interaction profile specifies (i) a corresponding user interface and (ii) a corresponding decision tree for forming data visualizations according to selected fields from the data set and according to user-selected analytic questions;

without further user interaction:

selecting a first plurality of fields in the dataset according to the first interaction profile; and displaying a first data visualization user interface corresponding to the first interaction profile;

in accordance with (i) the decision tree corresponding to the first interaction profile, (ii) the first plurality of fields, and (iii) a user-selected analytic question, displaying a first data visualization in the first data visualization user interface, wherein the first data visualization includes visual marks based on the first plurality of fields in the dataset;

receiving user specification of one or more data visualization characteristics in the first data visualization user interface, and updating the first data visualization according to the specified one or more data visualization characteristics;

receiving user selection of a second interaction profile distinct from the first interaction profile; and in response to the user selection of the second interaction profile:

displaying a second data visualization user interface corresponding to the second interaction profile; and displaying a second data visualization using at least a subset of the first plurality of fields in the dataset, wherein the second data visualization is displayed in accordance with the decision tree corresponding to the second interaction profile and the specified one or more data visualization characteristics.

9. The computer system of claim 8, wherein the specified one or more data visualization characteristics include color encoding of the visual marks.

10. The computer system of claim 8, wherein the specified one or more data visualization characteristics include size encoding of the visual marks.

11. The computer system of claim 8, wherein the specified one or more data visualization characteristics include specifying which aggregation function is used for summarizing data values for fields that are aggregated.

12. The computer system of claim 11, wherein the specified aggregation function is selected from the group consisting of SUM, AVERAGE, MIN, MAX, MEDIAN, and QUANTILE.

13. The computer system of claim 8, wherein the first interaction profile specifies category analytics, and the second interaction profile specifies time analytics.

14. The computer system of claim 8, further comprising in response to the user selection of the second interaction profile:

automatically selecting one or more additional fields from the dataset, wherein the one or more additional fields are not in the first plurality of fields;

wherein displaying the second data visualization uses the one or more additional fields.

15. A non-transitory computer readable storage medium storing one or more programs configured for execution by one or more processors of a computer system, the one or more programs comprising instructions for:

receiving user selection of a dataset and user selection of a first interaction profile of a plurality of interaction profiles, wherein each interaction profile specifies (i) a corresponding user interface and (ii) a corresponding decision tree for forming data visualizations according to selected fields from the data set and according to user-selected analytic questions;

without further user interaction:

selecting a first plurality of fields in the dataset according to the first interaction profile; and displaying a first data visualization user interface corresponding to the first interaction profile;

in accordance with (i) the decision tree corresponding to the first interaction profile, (ii) the first plurality of fields, and (iii) a user-selected analytic question, displaying a first data visualization in the first data visualization user interface, wherein the first data visualization includes visual marks based on the first plurality of fields in the dataset;

receiving user specification of one or more data visualization characteristics in the first data visualization user interface, and updating the first data visualization according to the specified one or more data visualization characteristics;

receiving user selection of a second interaction profile distinct from the first interaction profile; and in response to the user selection of the second interaction profile:

displaying a second data visualization user interface corresponding to the second interaction profile; and displaying a second data visualization using at least a subset of the first plurality of fields in the dataset, wherein the second data visualization is displayed in accordance with the decision tree corresponding to the second interaction profile and the specified one or more data visualization characteristics.

16. The computer readable storage medium of claim 15, wherein the specified one or more data visualization characteristics include color encoding of the visual marks.

17. The computer readable storage medium of claim 15, wherein the specified one or more data visualization characteristics include size encoding of the visual marks.

18. The computer readable storage medium of claim 15, wherein the specified one or more data visualization characteristics include specifying which aggregation function is used for summarizing data values for fields that are aggregated. and wherein the specified aggregation function is selected from the group consisting of SUM, AVERAGE, MIN, MAX, MEDIAN, and QUANTILE.

19. The computer readable storage medium of claim 15, wherein the first interaction profile specifies category analytics, and the second interaction profile specifies time analytics.

20. The computer readable storage medium of claim 15, further comprising in response to the user selection of the second interaction profile:

automatically selecting one or more additional fields from the dataset, wherein the one or more additional fields are not in the first plurality of fields;

wherein displaying the second data visualization uses the one or more additional fields.

* * * * *